United States Patent [19]

Itoh et al.

[11] Patent Number: 5,097,282
[45] Date of Patent: Mar. 17, 1992

[54] AUTOMATIC FOCUSING APPARATUS

[75] Inventors: Masatoshi Itoh; Hidenori Fukuoka; Kazuhiko Kojima, all of Osaka, Japan

[73] Assignee: Minolta Camera Kabushiki Kaisha, Osaka, Japan

[21] Appl. No.: 630,792

[22] Filed: Dec. 21, 1990

Related U.S. Application Data

[63] Continuation of Ser. No. 555,669, Jul. 18, 1990, which is a continuation of Ser. No. 449,064, Dec. 18, 1989, which is a continuation of Ser. No. 349,920, May 9, 1989, which is a continuation of Ser. No. 152,931, Feb. 5, 1988, abandoned.

[30] Foreign Application Priority Data

Feb. 6, 1987 [JP] Japan .................................. 62-26001
Feb. 7, 1987 [JP] Japan .................................. 62-26899

[51] Int. Cl.$^5$ .................................................. G03B 13/36
[52] U.S. Cl. .................................... 354/402; 354/406; 354/408; 358/227
[58] Field of Search ............... 354/402, 406, 407, 408, 354/432; 358/227

[56] References Cited

U.S. PATENT DOCUMENTS

| Re. 32,376 | 3/1987 | Fukuhara et al. | 354/432 |
|---|---|---|---|
| 4,083,056 | 4/1978 | Nakamura et al. | 354/25 |
| 4,284,335 | 8/1981 | Takemae et al. | 354/25 |
| 4,341,953 | 7/1982 | Sakai et al. | 250/204 |
| 4,373,791 | 2/1983 | Araki | 354/25 |
| 4,387,975 | 6/1983 | Araki | 354/25 |
| 4,415,246 | 11/1983 | Karasaki et al. | 354/25 |
| 4,416,523 | 11/1983 | Kawabata | 354/25 |
| 4,423,936 | 1/1984 | Johnson | 354/403 |
| 4,560,863 | 12/1985 | Matsumura et al. | 250/201 |
| 4,563,576 | 1/1986 | Matsumura et al. | 250/204 |
| 4,575,211 | 3/1986 | Matsumura et al. | 354/403 |
| 4,589,031 | 5/1986 | Tsuji | 358/227 |
| 4,614,418 | 9/1986 | Ishizaki et al. | 354/407 |
| 4,614,975 | 9/1986 | Kaite | 354/402 |
| 4,636,624 | 1/1987 | Ishida et al. | 250/201 |
| 4,650,309 | 3/1987 | Ishida et al. | 354/408 |
| 4,659,917 | 4/1987 | Suzuki et al. | 250/201 |
| 4,664,495 | 5/1987 | Alyfuku et al. | 354/430 |
| 4,681,419 | 7/1987 | Sakai et al. | 354/402 |
| 4,687,917 | 8/1987 | Kusaka et al. | 250/201 |
| 4,716,434 | 12/1987 | Taniguchi et al. | 354/408 |
| 4,766,302 | 8/1988 | Ishida et al. | 250/201 |
| 4,768,052 | 8/1988 | Hamada et al. | 354/402 |
| 4,768,054 | 8/1988 | Norita et al. | 354/408 |

FOREIGN PATENT DOCUMENTS 58-49844 11/1983 Japan .
58-224318 12/1983 Japan .
(List continued on next page.)

Primary Examiner—Russell E. Adams
Attorney, Agent, or Firm—Burns, Doane, Swecker & Mathis

[57] ABSTRACT

The disclosure relates to an automatic focusing apparatus for use in a photographic camera and, in a particular video-camera. The apparatus includes a defocus amount detecting device such as charged coupled devices (CCD) array for detecting the defocus amount of a photographic lens, a memorizing device for memorizing the focusing zone to carry out the lens-focus-adjustment, a comparing device for comparing between the specific setting value and the detected defocus amount, a selecting device for selecting the focusing zone so as to carry out the lens-focus-adjustment in accordance with a detection of the focusing condition, a focus adjusting mechanism for carrying out the lens-focus-adjustment on the basis of the defocus amount of the focusing zone selected by the selecting device, and a focusing zone alteration device for rememorizing the focusing zone with respect to the change of the focusing zone at which the lens-focus-adjustment is carried out. The displacement of the defocus amount corresponding to the change of a relative location of the object to the photographic lens is approximately proportional to the displacement of the output signal of the defecting device of the defocus amount, so that it is possible to know by detecting the defocus amount whether or not the photographic lens is properly focused and where the object is located in a photographic field if not focused.

28 Claims, 22 Drawing Sheets

FOREIGN PATENT DOCUMENTS

| | | |
|---|---|---|
| 59-30510 | 2/1984 | Japan . |
| 59-48719 | 3/1984 | Japan . |
| 59-67505 | 4/1984 | Japan . |
| 59-107311 | 6/1984 | Japan . |
| 59-123822 | 7/1984 | Japan . |
| 59-129810 | 7/1984 | Japan . |
| 59-146032 | 8/1984 | Japan . |
| 60-14211 | 1/1985 | Japan . |
| 60-37509 | 2/1985 | Japan . |
| 60-101514 | 6/1985 | Japan . |
| 60-120675 | 6/1985 | Japan . |
| 60-144711 | 7/1985 | Japan . |
| 60-183879 | 9/1985 | Japan . |
| 60-249477 | 12/1985 | Japan . |
| 60-250318 | 12/1985 | Japan . |
| 60-256112 | 12/1985 | Japan . |
| 61-12177 | 1/1986 | Japan . |
| 61-18271 | 1/1986 | Japan . |
| 61-28914 | 2/1986 | Japan . |
| 61-29813 | 2/1986 | Japan . |
| 61-34515 | 2/1986 | Japan . |
| 61-53614 | 3/1986 | Japan . |
| 61-55618 | 3/1986 | Japan . |
| 61-70407 | 4/1986 | Japan . |
| 62-14015 | 1/1987 | Japan . |
| 62-67971 | 3/1987 | Japan . |
| 62-95511 | 5/1987 | Japan . |
| 62-138808 | 6/1987 | Japan . |
| 62-166309 | 7/1987 | Japan . |
| 62-173413 | 7/1987 | Japan . |
| 62-189415 | 8/1987 | Japan . |
| 62-204247 | 9/1987 | Japan . |
| 63-10135 | 1/1988 | Japan . |
| 63-10136 | 1/1988 | Japan . |

OBJECT

BACKGROUND   OBJECT

AUTOMATIC FOCUSING APPARATUS

This application is a continuation of application Ser. No. 555,669, filed July 18, 1990, which is a continuation of prior application Ser. No. 449,064, filed on Dec. 18, 1989, which is a continuation of prior Ser. No. 349,920, filed on May 9, 1989, which is a continuation of prior application Ser. No. 152,931, filed on Feb. 5, 1988, now abandoned.

BACKGROUND OF THE INVENTION

1. Field of the invention

The present invention relates generally to an automatic focusing apparatus having a function of chasing or tracking an object, and more particularly to the apparatus to be utilized for automatic focus-adjusting of a photographic lens of a video-camera and a camera having a function of an automatic focus adjustment.

A conventional automatic focusing apparatus for use in a video-camera is generally of a type that a focusing zone thereof is unchangeable, so that the focus adjustment of the photographic lens to an object to be photographed is impossible when the object is beyond the corresponding focusing zone, and accordingly much more inferior picture images are produced so far. In order to avoid such disadvantage, there has been provided a method of changing the focusing zone depending upon a photographer's intention. However, shifting of the focusing zone by manual operation induces troublesomeness, and furthermore it happens to induce not only unconcentration of photographing but also misjudgement of shifting the focusing zone.

For example, Japanese Laid-open Patent Publication No. 146028/1984 discloses an apparatus for automatically shifting the focusing zone, which is described hereinbelow.

The apparatus is provided with a plurality of focusing zones. One distance measuring data, which is one of distance measuring data corresponding to the shortest distance between the photographic lens and the object, is selected out of some of distance measuring data corresponding to each focusing zone in order to bring the object located closest to a photographer into in-focus position In this prior art, it is ensured to chase the object automatically only when the object to be photographed is located closest to a photographer. However, if another object exists between the photographic lens and the object to be photographed, that is, if another object is located closer to the photographer than the object to be photographed is located, the focus adjusting operation must be done as to said another object, so that it is not ensured that the focus adjusting operation can not be carried out as to the object to be photographed.

In photographing a movable object, such as a person who is playing sports, using the video-camera, it is desirable that the automatic focus adjustment is carried out as chasing the object automatically. In the automatic focusing apparatus by which the focus adjustment of the photographic lens as to any one selected out of a plurality of focusing zones can be carried out, there may be available such a method in which the focus detection is preferentially carried out as to the focusing zone which has been used at the preceding distance measuring and if reliability of the focus detection on the focusing zone having priority becomes low, another focusing zone is selected assuming that the object has moved to any place. However, the above method still has the following problem. For instance, when a person as the object being in one focusing zone, as shown in FIG. 7A, has moved sideways so that another object, on which the lens can be focused, appears in the background, as shown in FIG. 7B, the focus adjustment must be done with respect to the background as an object and thus, there remains such a disadvantage that execution of the focus adjustment with respect to said person to be photographed is impossible.

SUMMARY OF THE INVENTION

It is accordingly a primary object of this invention to provide an improved automatic focusing apparatus which enables to carry out the focus adjustment as chasing the moving object automatically.

In accomplishing the abovementioned object, there is provided, in accordance with the present invention, an improved automatic focusing apparatus in use, for example, for a video-camera and a camera with AF-function. The automatic focusing apparatus includes means for detecting a defocus amount of a photographic lens as to each focusing zone, means for memorizing a focusing zone at which focus adjustment of the photographic lens is to be carried out, means for comparing a specific setting value and a defocus amount which is detected by the defocus amount detecting means, means for selecting a focusing zone so as to carry out a focus adjustment of the photographic lens in accordance with a detection of the focusing condition, a focus adjusting means for carrying out the focus adjustment of the photographic lens on the basis of the defocus amount of the focusing zone selected by the selecting means and a focusing zone alteration means for rememorizing the focusing zone in the memorizing means with respect to the change of the focusing zone to carry out the focus adjustment of the photographic lens.

With the automatic focusing apparatus as described above, when it is decided by the comparing means that the defocus amount of the focusing zone memorized in the memorizing means is less than the specific setting value, the focus adjustment of the photographic lens on the memorized focusing zone is carried out through the selecting means by the focus adjusting means. On the contrary, when it is detected by the comparing means that the defocus amount of the focusing zone memorized in the memorizing means is larger than the specific setting value, the focus adjustment of the photographic lens on a focusing zone having the minimum defocus amount selected out of a plurality of focusing amounts which have been detected by the defocus detecting means is carried out through the selecting means by the focus adjusting means. Accordingly, it is ensured that when the defocus amount increases suddenly, the object, which is located closest to a focal point of the photographic lens at the moment, is brought into in-focus position. And also it is ensured that the object is brought into in-focus position if the object moves sideways in the same photographic field. Furthermore, when the focusing zone, at which the focus adjustment is carried out, has been shifted, contents in the memorizing means shall be renewed by the focusing zone alteration means. Accordingly, the further focus adjustment of the photographic lens at the next time is carried out on the shifted focusing zone because the preceding focusing zone is memorized by the memorizing means. Therefore, according to the present invention, the focus adjustment of the photographic lens can be carried out as chasing the object which is moving within the photographic field.

BRIEF DESCRIPTION OF THE DRAWINGS

The above object and feature of the present invention will become apparent from the following description taken in conjunction with the preferred embodiment thereof, with reference to the accompanying drawings, in which.

DETAILED DESCRIPTION OF THE PREFERRED EMBODIMENT

Figure 1:
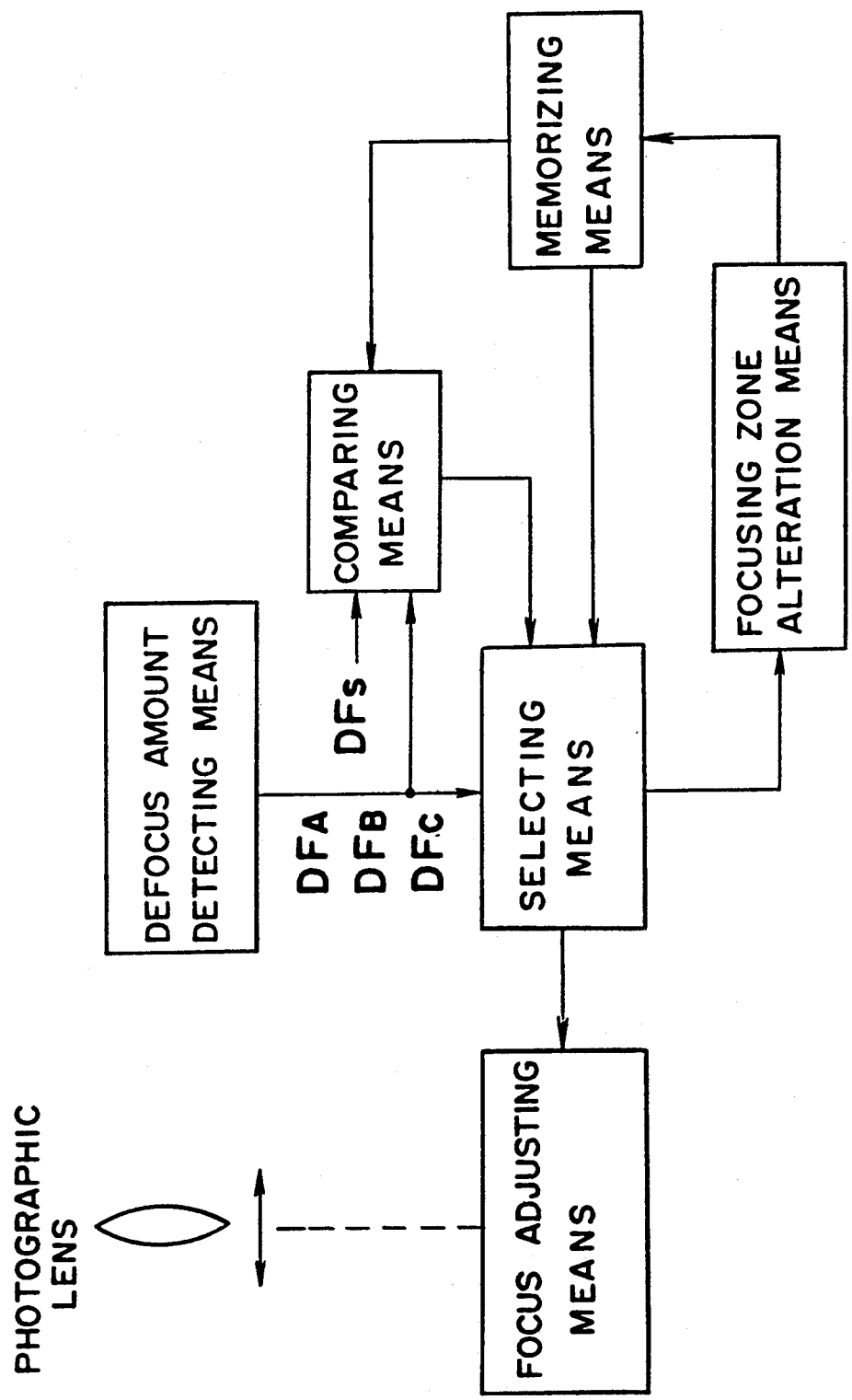
FIG. 1 is a block diagram showing an automatic focusing apparatus according a preferred embodiment of the present invention which is to be incorporated in a video-camera.

Before the description of the present invention proceeds, it is to be noted that like parts are designated by like reference numerals and symbols throughout several views of the accompanying drawings.

The outline of the feature of the present invention is described in conjunction with FIG. 1.

In the automatic focusing apparatus according to the present invention, a plurality of focusing zones are provided and it is designed so as to carry out the focus adjustment of the photographic lens as to any one zone selected out of a plurality of focusing zones.

Furthermore, the automatic focusing apparatus is provided with a defocus amount detecting means by which a defocus amount $DF_A$, $DF_B$ and $DF_C$ of a photographic lens as to each focusing Zone A, B, and C is detected.

The automatic focusing apparatus is further provided with a memorizing means for memorizing the focusing zone at which a focus-adjustment of the photographic lens is to be carried out.

The automatic focusing apparatus is further provided with a comparing means for comparing a specific setting value $DF_S$ and the defocus amount which is detected by said defocus amount detecting means on the focusing zone memorized in the memorizing means.

The automatic focusing apparatus is further provided with a selecting means for selecting the focusing zone so that the focus adjustment of the photographic lens on the focusing zone, which is memorized in the memorizing means, is carried out when it is decided by the comparing means that said defocus amount is less than the specific setting value, on one hand, while the focus adjustment of the photographic lens on the focusing zone having the minimum defocus amount selected out of a plurality of the defocus amounts detected by the defocus amount detecting means is carried out when it is decided by the comparing means that said defocus amount is larger than the specific setting value.

The automatic focusing apparatus is further provided with a focus adjusting means for carry out the focus-adjustment of the photographic lens on the basis of the defocus amount of the focusing zone which has been selected by the selecting means.

The automatic focusing apparatus is further provided with a focusing zone alteration means for renewing the memory of the focusing zone when the focusing zone selected by the selecting means is different from the focusing zone memorized in the memorizing means.

FIG. 1 is the explanatory block-diagram showing an essential structure of the automatic focusing apparatus according to the present invention. It is to be noted that the most parts of the defocus amount detecting means and the focus adjusting means, the comparing means, the selecting means, the memorizing means, and the focusing zone alteration means are accomplished by a program of a microcomputer.

Figure 7A:
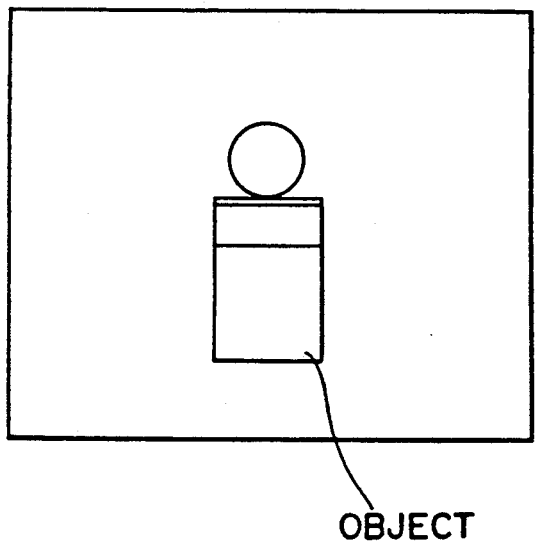
FIGS. 7A and 7B are, respectively, explanatory views showing field views through a view-finder of the above video-camera.
Figure 7B:
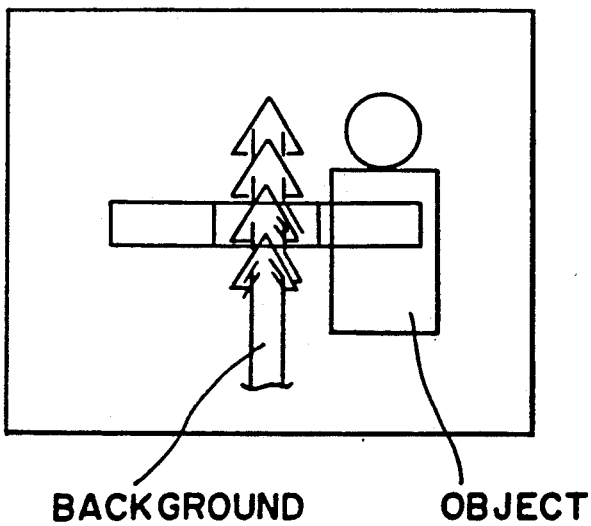

The operation of the above-described structure of the automatic focusing apparatus is as follows:

The automatic focusing apparatus operates in different manners depending on the following conditions;

First it is decided by the comparing means whether or not the defocus amount of the focusing zone which is memorized in the memorizing means is larger than the specific setting value. There are two operation modes available. When it is decided by the comparing means that the abovementioned defocus amount is less than the specific setting value, the focus adjustment of the photographic lens on the memorized focusing zone is carried out. On the contrary to the above, when it is decided by the comparing means that it is larger than the specific setting value, the defocus amounts of respective focusing zones are compared with each other, and then the focus adjustment of the photographic lens as to the focusing zone having the minimum defocus amount given by the above comparison is carried out. Accordingly, it is ensured that when the defocus amount increases suddenly, the object, which is located closest to a focal point of the photographic lens at that moment, is brought into in-focus position. And also, it is ensured that the object is brought into in-focus position if the object moves sideways in the same photographic field. For instance, if a person as the object who is located at a center of the field, as shown in FIG. 7A, moves in the right direction in the field as shown in FIG. 7B, a defocus amount at the center of the field becomes suddenly large. Therefore, comparing the defocus amounts of respective focusing zones, the focus adjustment as to the focusing zone having the minimum defocus amount, i.e., the focusing zone of the right side of the field, is carried out. Furthermore, provided the focusing zone, at which the focus adjustment of the photographic lens is carried out, has been shifted, the further focus adjustment of the photographic lens at the next time is carried out as to the focusing zone to which the object has moved since the memorized contents in the memorizing means are renewed. Accordingly, it is ensured that the focus adjustment of the photographic lens is carried out as chasing automatically the object. It will be apparent that the present invention, as described above, enable to carry out the focus adjusting of the photographic lens during chasing the object whenever the object moves within the photographic field, because the present invention is provided with the following functions;

(1) It is ensured that the focusing zone to carry out the focus adjustment of the photographic lens is memorized by the memorizing means.

(2) When the defocus mount of the focusing zone which has been memorized is larger than the specific setting value, it is ensured to carry out the focus adjustment as to the focusing zone having the minimum defocus amount selected out of the respective defocus amounts of a plurality of the focusing zones provided and it is ensured that its focusing zone is memorized, as a focusing zone to carry out the focus adjustment of the photographic lens instead of the preceding focusing zone memorized.

Figure 2:
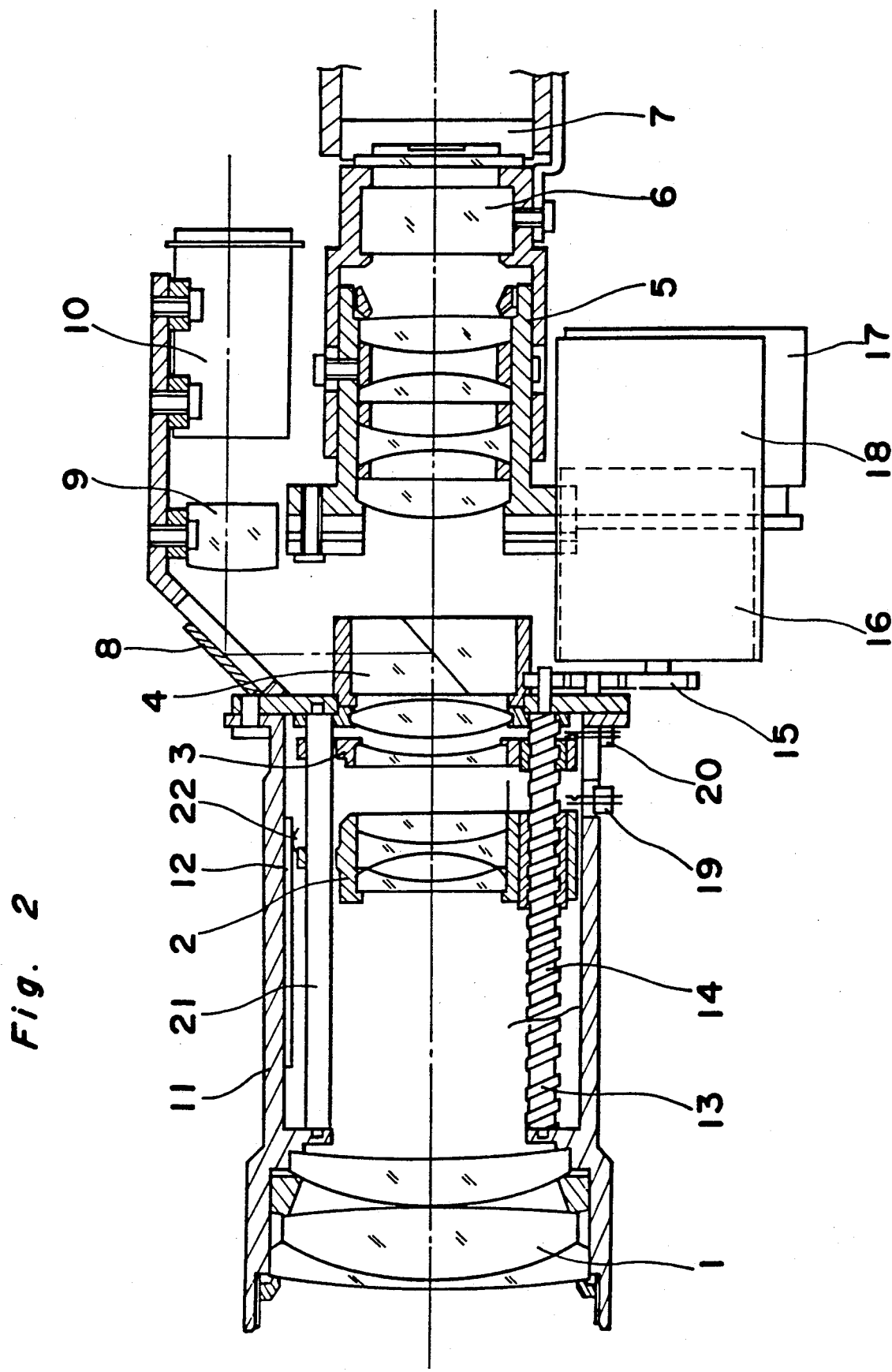
FIG. 2 is a cross-sectional view of the video-camera according to the embodiment of the present invention; is a diagram showing a focus detecting arrangement applied to the above video-camera.

Referring now to FIG. 2, there is shown a inside structure of the video-camera having an automatic focusing apparatus according to an embodiment of the present invention.

A photographic lens comprises a group of front-lenses 1, a group of zoom lenses 2, a group of focusing lenses 3, a group of master lenses 5. The group of front-lenses 1 is fitted to a fixed lens-barrel 11 for photographic lens.

The group of zoom lenses 2, hereafter referred as a variator 2, is fitted movably to a guide bar 21, which is installed in parallel with the optical axis, in the fixed lens-barrel 11. Furthermore, the group of zoom lenses 2 is engaged with a threaded bar 14 for zooming which is rotatably supported with the fixed lens-barrel 11. Thus the variator 2 can move in the direction of a photographic optical axis when the threaded bar 14 rotates. The threaded bar 14 is connected with a motor for zooming through a gear train 15. Furthermore, the variator 2 has a slide brush 22. The slide brush 22 travels in contact with a contact bar of a zoom encoder 12 which is fixed to the fixed lens-barrel 11, so that the position of the variator 2 can be detected.

The group of focusing lenses 3, hereafter referred as a compensator 3, is slidably fitted to the guide bar 21, and also is engaged with a threaded bar 13 for automatic focusing, which is rotatably supported with the lens barrel 11, thus the compensator 3 can move in the direction of the photographic optical axis when the threaded bar 13 rotates. The threaded bar 13 for automatic focusing is connected with an AF-motor 16 through a gear train (not shown).

Reference numeral 4 shows a beam splitter. A light emitted from an object passes through the group of front-lenses, the variator 2 and the compensator 3 in order, and after the light has passed through the beam splitter 4, most of the light passes through the group of master lens 5 and a low-pass filter 6, and finally reaches photographic image elements CCD 7. On the contrary, some part of the light from the object, which is reflected at the beam splitter 4 and advances toward the perpendicular direction, is fully reflected at a total reflection mirror 8 and passes through an image forming lens 9 and reaches a focus detecting module 10 where CCD line-sensor for automatic focusing and others are enclosed. Moreover, the total reflection mirror 8, the image forming lens 9, and the focus detecting module 10 are fixed to the fixed lens-barrel 11 in a known proper manner. Furthermore, the group of master lenses 5, the low-pass filter 6, photographic image elements CCD 7 and a diaphragm meter 17 are fixed to the fixed lens-barrel 11 in a known proper manner. Reference numerals 19 and 20 designate limit switches for detecting different two positions of the compensator 3, respectively.

Figure 3:
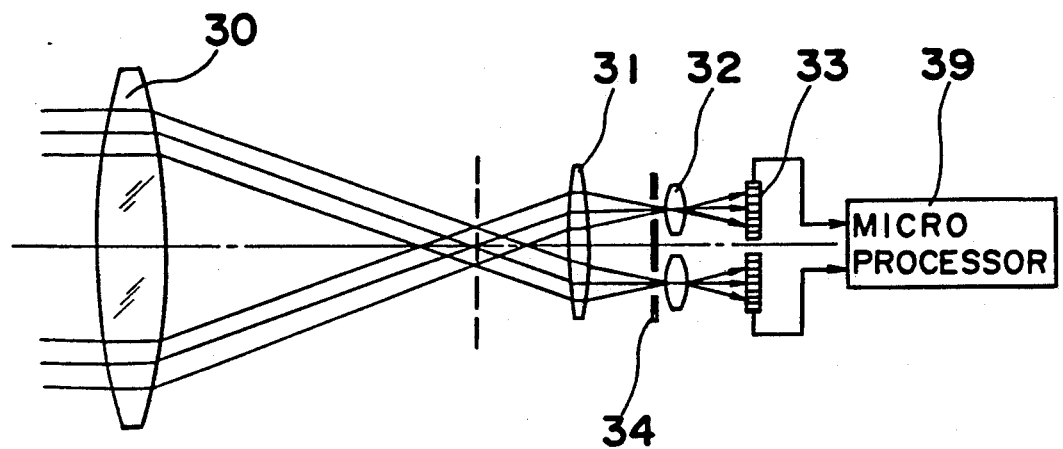
FIG. 3 is a explanatory diagram showing the operations of the focus detecting arrangement.
Figure 4:
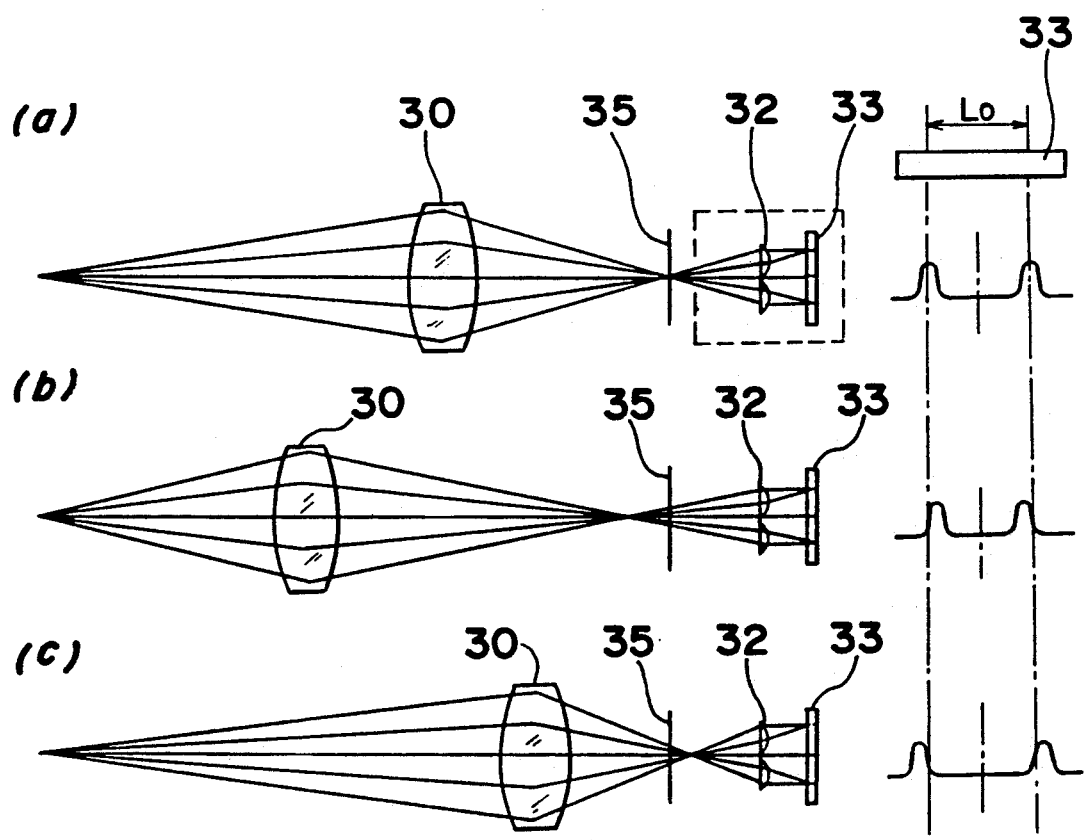
FIG. 4 is a explanatory diagram showing the operations of the focus detecting arrangement.

FIG. 3 shows an arrangement of focus detecting module 10. In FIG. 3, reference numeral 30 designates a focusing lens, 31 a relay lens, 32 an image reforming lens, 33 a CCD line-sensor, and 34 a mask. The light emitted from the object, which has passed through the focusing lens 30, will be divided into two luminous flux, which pass, respectively, through the corresponding reforming lens 32 and form respective images on both a specific area and a reference area which are arranged on the CCD line-sensor 33. In FIG. 4, a upper view a) shows such an in-focus condition that the light, which has emitted from the object and passed through the lens 30, is focused on a plane 35 equivalent to a focal plane of the camera, and forms two images on the CCD line-sensor 33. Assuming that the distance between two images on the CCD line-sensor 33 at an in-focus condition is "Lo" in the upper view a), the distance is shorter than "Lo" at a front focus condition, as shown in the middle view b), while the distance is longer than "Lo" at a rear focus condition, as shown in the lower view c). Besides, the distance between two images is nearly in proportion to a defocus amount. Therefore, it is possible to know by detecting the distance between two images whether the lens is now in in-focus position or not. It is further possible to know a defocus amount in case of out-of-focus, by a micro processor 39, and which in turn is used for driving the AF-motor, to rotate the threaded bar 13 through the gear train (not shown), resulting in that the compensator 3 moves along the optical axis as being guided by the guide bar 21 toward the in-focus point.

Figure 5A:
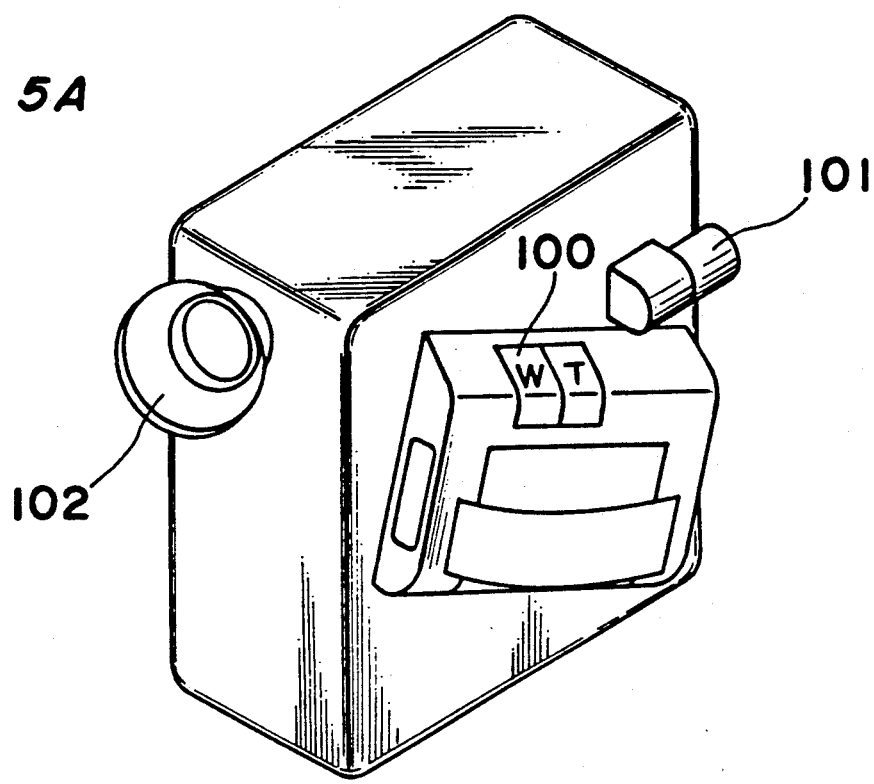
FIGS. 5A and 5B are, respectively, perspective views showing the above video-camera.
Figure 5B:
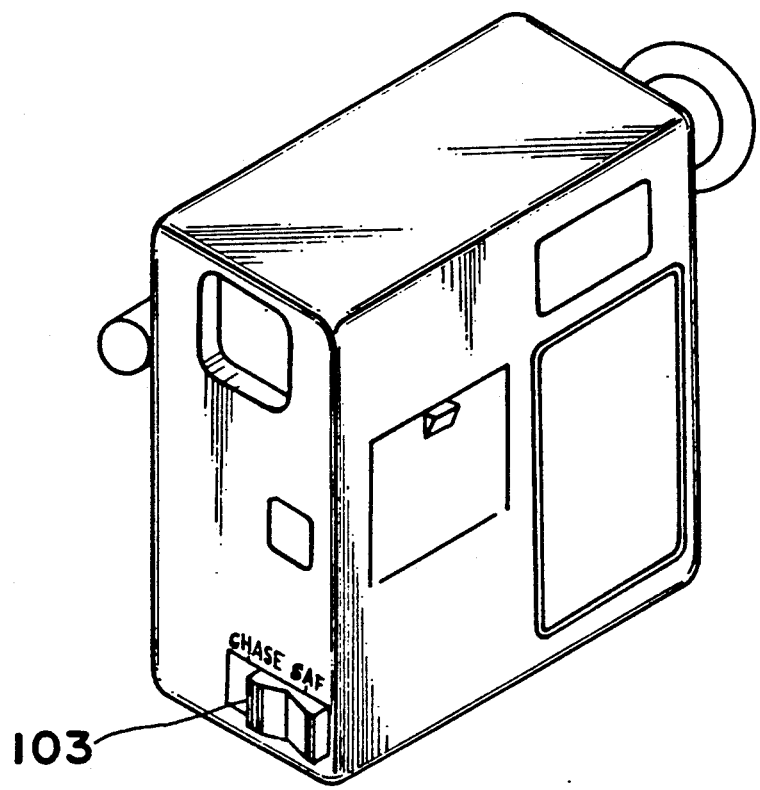

FIGS. 5A and 5B show a video-camera according to an embodiment of the present invention. Reference numeral 100 designates zooming operation buttons. In FIG. 5A, "W" represents a zooming operation button to shorten a focal length while "T" represents a zooming operation button to lengthen a focal length. Reference numerals 101, 102, 103 designate, in turn, a microphone for catching and recording a sound, an eye-piece attachment of a view-finder and a slide-switch for selecting AF-mode. The operation relating to the above is as follows:

1) By pressing down the buttons 100, the zooming motor 18 starts rotating.

2) When the zooming motor 18 rotates, the threaded bar 14 for zooming starts rotating through the gear train 15.

3) By rotating of the threaded bar 14, the variator lens 2 moves along the optical axis as being led by the guide bar 21.

Figure 6:
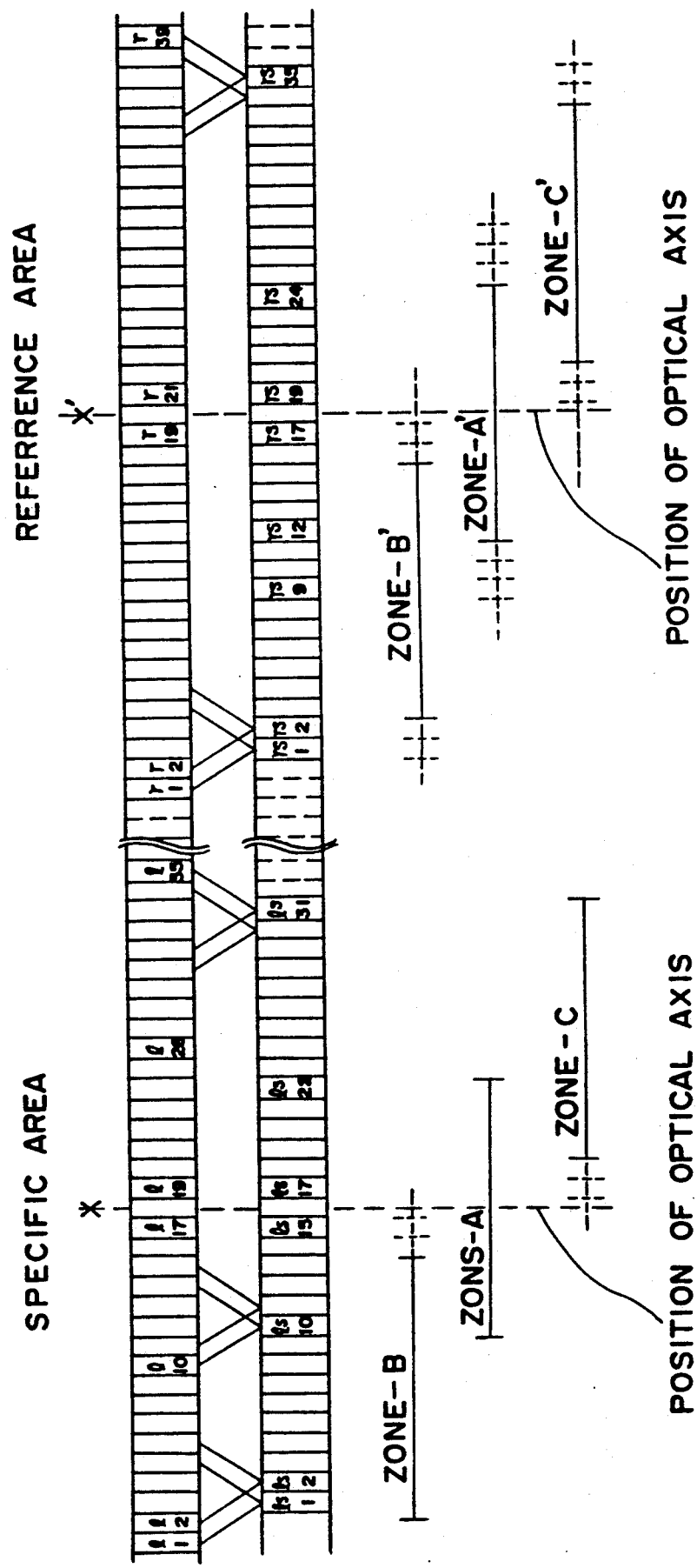
FIG. 6 is an explanatory view showing a CCD-line sensor applied to the focus detecting arrangement in FIG. 3.

Next, referring now to FIG. 6, there is shown a relation between the specific area and reference area, which are respectively set up on the CCD line-sensor 33, and relation between the focusing area, which are set up in the specific area and the reference area. It is to be noted that the abovementioned specific area, reference area, and focusing area are respectively set up in a program in the microprocessor 39, which will be described later. Thirty five elements of the CCD elements array $l_1-l_{35}$ included in the CCD line-sensor 33 are assigned to the specific area. Similarly, thirty nine elements of the CCD elements array $r_1$-$r_{39}$ included in the CCD line-sensor 33 are assigned to the reference area. The focusing area comprises three focusing Zones A, B and C to each of which seventeen elements are assigned. The focusing Zone A comprises seventeen elements $l_{10}l_{26}$, the focusing Zone B comprises seventeen elements $l_1$-$l_{17}$, and the focusing Zone C comprises seventeen elements $l_{19}$-$l_{35}$. Furthermore, the microprocessor 39 stores all of data of difference $l_s$ between two elements of the CCD elements, e.g., $l_1$ and $l_5$, which are located beyond three elements. Accordingly, each focusing Zone A, B and C has a following correspondence with data of difference $l_s$. Zone A corresponds to thirteen elements of data of difference $l\,s_{10}$-$l\,s_{22}$, and Zone B corresponds to thirteen elements of data of difference $l\,s_1$-$l\,s_{13}$, and Zone C corresponds to thirteen elements of data of differences $l\,s_{19}$-$l\,s_{31}$. As to the focusing area of the reference area, the abovementioned correspondence can be similarly applied. Namely, as shown in FIG. 6 (right side half) the focusing Zone-A, focusing Zone-B and focusing Zone-C are, respectively, corresponding to Zone A', Zone B', and Zone C'. In addition, marks "X" and "X'" show, respectively a optical standard position (optical axis).

The general outline of a focus detecting arithmetic and a shifting operation of the focusing Zones is described below. Regarding the selection of three focusing Zones, the focusing Zone-A takes priority of the focusing Zone-B and the focusing Zone-C. In addition, the arithmetic of focus detection is carried out in accordance with a correlative amount which is a result of the arithmetic of focus detection at the focusing Zone-A in case the value, which is obtained by normalizing said correlative amount with the contrast value of the object, is smaller than the specific setting value. In case said value is larger than the specific setting value, the arithmetic of focus detection is carried out using a correlative amount at the focusing Zone-B and the focusing Zone-C. The decision whether or not the photographic lens which is turned to the object is now in in-focus position is carried out by detecting phase difference between two output signals produced respectively by the specific area and the reference area which are setup on the CCD line-sensor 33. However, reliability of said decision as to in-focus becomes low when the contrast of the object is low. This is because, that difference of output signals produced by the respective elements of CCD array are low, and correspondence of the two output signals between the specific area and the reference area becomes low, and besides the noise is influential. Thus, each correlative amount of the specific area and the reference area is calculated, and when a value, which is obtained by normalizing the correlative amount using the contrast value of the object, is larger than the specific setting value, the focus detecting result in a corresponding focusing Zone is disregarded, and then, the same procedure is taken again after changing to an another focusing Zone.

The abovementioned arithmetic methods are as follows.

As a focusing Zone, the focusing Zone A always takes priority of the others. First, the data of difference between two elements of CCD, which are located beyond there elements of CCD, is calculated with respect to the specific area and the reference area, respectively.

That is, data of difference $l\,sk$ with respect to the specific area is:

$$l\,sk = l\,k - l(k+4)$$

wherein, k is from 1 to 31.

Data of difference $r_{sk}$ with respect to the reference area is:

$$r_{sk} = r\,k - r(k+4)$$

wherein, k is from 1 to 35.

Secondly, a value which is a total sum of difference of two difference data $l_{sk}$ adjacent to each other in the specific area, is defined as Contrast of a focusing Zone. That is, Contrast $C_A$ of the focusing Zone-A is:

$$C_A = \sum_{k=10}^{21} |ls(k) - ls(k+1)| \quad (1)$$

Contrast $C_B$ of the focusing Zone-B is:

$$C_B = \sum_{k=1}^{12} |ls(k) - ls(k+1)| \quad (2)$$

Contrast $C_C$ of the focusing Zone-C is:

$$C_C = \sum_{k=19}^{30} |ls(k) - ls(k+1)| \quad (3)$$

Thirdly, the correlative amount between difference data $l_{sk}$ belonging to the specific area and difference data $r_{sk}$ belonging to the reference area is calculated.

The correlative amount $H_A(i)$ of the focusing Zone A is:

$$H_A(i) = \sum_{k=1}^{13} |ls(k+9) - rs(k+i)| \quad (4)$$

wherein, "i" is from 0 to 22.

Then, the minimum correlative amount $H_A(i_{MI})$ from respective calculation results, i.e., correlative amounts $H_A(0) - H_A(22)$, is regarded as the correlative amount which belongs to the portion having the highest correlation.

That is, $$H_A(i_{MI}) = \text{Min.}[H_A(0), \ldots, H_A(22)] \quad (5)$$

wherein, the in-focus condition is attained when $i_{MI}$ is 11, so that difference deviated from this value corresponds to a defocus amount. Fourthly, the abovementioned correlative amount $H_A(i_{MI})$ in the portion having highest correlatively is normalized by Contrast $C_A$ of the focusing Zone A, which is calculated with the abovementioned equation (1). Incidentally, the purpose of normalizing by Contrast $C_A$ is to enable the microprocessor 39 always to make decision with a certain level even if the quantity of stored charge in CCD line-sensor 33 would change in accordance with the luminance of the object, so that the value of $H_A(i_{MI})$ might change. The correlative amount which belongs to the portion having the highest correlation after normalizing is represented by the following equation:

$$Y_{MA} = H_A(i_{MI})/C_A \quad (6)$$

Then, said correlative amount $Y_{MA}$ is compared with the specific setting value $Y_s$. Generally, when the luminance of the object is low, S/N ratio of output CCD deteriorates so that a focus detecting result becomes unstabilized. In this case, a value of $Y_{MA}$ becomes larger because a value of $C_A$ in the abovementioned equation (6) becomes smaller. Moreover, in case an object is, for example, a wall having no pattern, the value of Contrast $C_A$ becomes smaller by applying data of difference. Consequently, a value of $Y_{MA}$ becomes larger. Therefore, by making a comparison between the value of $Y_{MA}$ and the specific setting value Ys, it is possible to check whether or not the focus detection is capable, that is to say, "low contrast checking". In case of $Y_{MA} < Y_s$, which means that a focus detectable object exists within the focusing Zone A, on the basis of the value of "$i_{MI}$" which is obtained by the above calculation, the defocus amount away from an in-focus position is calculated and a focusing operation is carried out by lens driving. On the contrary to the above, in case it is satisfied that $Y_{MA} \geq Y_s$, which means reliability of a focus detecting result as obtained is low, the focus detecting result of the focusing Zone A is disregarded and the focusing zone is shifted from Zone A to Zone B or Zone C.

In case of $Y_{MA} < Y_s$, calculation of the defocus amount starts. In case extreme change of the defocus amount may happen, for example, a personal object being in the focusing Zone A, as shown in FIG. 7A, moves toward either a right side direction or a left side direction, so that just a background, which can be focused, appears within the focusing Zone A, as shown in FIG. 7B. Accordingly, there is a possibility to bring the background into in-focus position if comparison between $Y_{MA}$ and Ys is only made. Consequently, it happens not to bring a target person into in-focus position. In order to avoid this case, even if it is satisfied that $Y_{MA} < Y_s$, the defocus amount, on which lens driving is practically carried out on the basis of each defocus amount of three focusing Zones A, B and C, is calculated after the focus detecting arithmetic with respect to both the focusing Zone B and C in the case where an absolute value of the defocus amount $DF_A$ is larger than an absolute value of the specific setting value DFs.

In respect to the focusing Zone B, which is similar to the case of focusing Zone A, a correlative amount $H_B(i)$ is as follows:

$$H_B(i) = \sum_{k=1}^{13} |ls(k) - rs(k+i)|$$

wherein, "i" is from zero 0 to 22.

The correlative amount $H_B(i_{MI})$ having the highest correlation among a plural of calculated results $H_B(i)$ is as follows:

$$H_B(i_{MI}) = \text{Min.}[H_B(0), \ldots, H_B(22)]$$

The value $Y_{MB}$ normalized by contrast $C_B$ of the focusing Zone B is as follows:

$$Y_{MB} = H_B(i_{MI})/C_B$$

In respect to the focusing Zone C, it is similar to the above. That is to say, the following equations are established:

$$H_C(i) = \sum_{k=1}^{13} |ls(k+18) - rs(k+i)|$$

wherein, "i" is from zero 0 to 22.

$$H_C(i_{MI}) = \text{Min.}[H_C(0), \ldots, H_C(22)]$$

$$Y_{MC} = H_C(i_{MI})/C_C$$

Fifthly, comparison between Ys, and $Y_{MB}$ or $Y_{MC}$ starts. In case it is satisfied that $Y_{MB} < Y_s$, or $Y_{MC} < Y_s$, which means that a detectable object exists in the focusing Zone B or the focusing Zone C, the focusing operation can be carried out by lens driving on the basis of the defocus amount. On the contrary to the above, in case it is satisfied that $Y_{MB} >= Y_s$ or $Y_{MC} => Y_s$, which means that there is no detectable object in all of the focusing Zones A, B and C, it is decided that focus detection is impossible, and warning indication or the equivalent is made. Furthermore, in case both conditions of $Y_{MB}Y_s$ and $Y_{MC}Y_s$ are satisfied, it means that some detectable objects exist in both the focusing Zones B and C. In this case, either Zone B or C can take priority. In this embodiment according to the present invention, the following manner will be taken, Namely, in case the detectable object does not exist in the focusing Zone A, that is, $Y_{MA} >= Y_s$ is satisfied, smaller one out of two absolute values corresponding to two defocus amounts $DF_B$ and $DF_C$ can be selected. That means the focusing operation is effected to the object which is located closest to the focal position of the photographic lens at the moment. This stands upon the assumption that a object like a person or so on can hardly move so suddenly away from a video-camera.

Figure 8A:
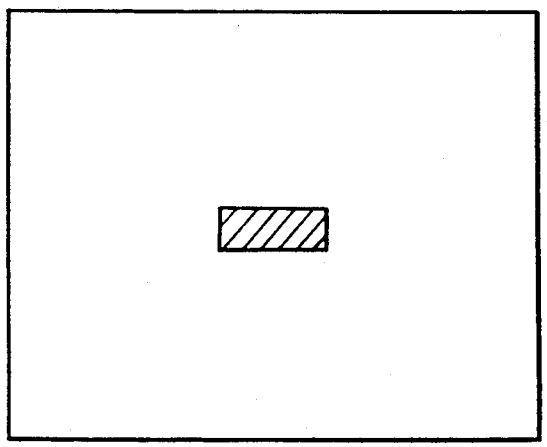
FIGS. 8A and 8B are, respectively, showing indication marks in of the above video-camera.
Figure 8B:
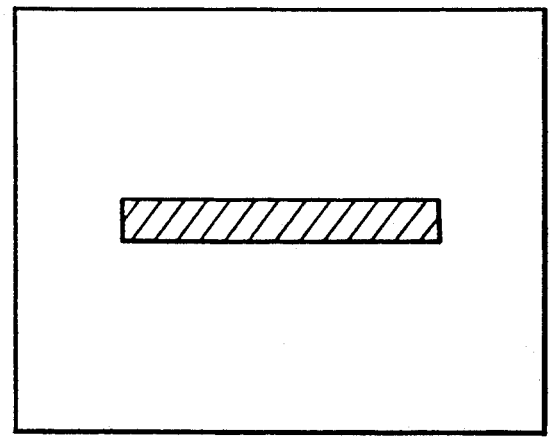

Incidentally, an indication of a focus detecting area shown in a view-finder is as follows. On selecting the focusing Zone A, a small area mark (a shaded portion), as shown in FIG. 8A, appears in the view-finder. On selecting the focusing Zone B or C, i.e., not selecting the focusing Zone A, a large area mark (a shaded portion) as shown in FIG. 8B appears in the view-finder.

Referring now to FIG. 9A through FIG. 13C, there are shown flow charts for a shifting operation of the focusing zone of a video-camera according to an embodiment of the present invention. This program is initiated from "START" shown in FIG. 9A. First, all zone flags are reset at step #1. Then, the Zone A flag is set as initial setting at step #2. At step #3, the small area mark appears in the view-finder. This mark makes an operator understand easily which zone has been now set on photographing by the video-camera. Next, integration at CCD is carried out at step #4, and data dumping is carried out at step #5. It means informations for automatic focusing subject to the result of CCD integration are inputted to a register in the microprocessor. Next, at step #6, it is decided whether the Zone A flag is set or not. As the Zone A flag has been set at the initial stage, the program advances to step #7, and the correlation arithmetic $Y_{MA}$ of the focusing Zone A is carried out. At step #8, comparison between the specific setting value Ys and value $Y_{MA}$ which is normalized by contrast $C_A$ of the focusing Zone A, using the correlative amount obtained at step #7 is made for the purpose of the "low contrast checking" of the focusing Zone A. When it is satisfied at step #8 that $Y_{MA} >= Y_s$, it is decided that no detectable object exists in the focusing Zone A, i.e., it means "low-contrast", and the program advances to step #9. At step #9 the area indication mark changes from the small area mark to the large area mark. At step #10 and #11, the correlative arithmetic of the focusing Zone B and C is carried out respectively, At step #12, comparison between $Y_{MB}$ and Ys is made as similarly made at step #8. When it is satisfied at step #12 that $Y_{MB} \geq Ys$, it is decided that Zone B is "low-contrast", and the program advances to step #13. At step #13, comparison between $Y_{MB}$ and Ys is made. When it is satisfied at step #13 that $Y_{MC} \geq Ys$, it is decided that Zone C is "low-contrast". In this case, the detectable object does not exist in any zone of the respective focusing Zones A, B and C. Namely, it means focus detection is impossible. Therefore, the program advances to step #14, and warning indication is made at step #14, then the program returns to step #4, and the focus detecting operation is repeatedly carried out.

When it is satisfied at step #13 that $Y_{MC} < Ys$ (low-contrast checking of the focusing Zone C), it is decided that the detectable object is existing only in the focusing Zone C. Accordingly, the program goes to step #15 shown in FIG. 9B. At step #15, the arithmetic of the defocus amount DFc with respect to the focusing Zone C is carried out, and the Zone A flag is reset at step #16, and the Zone C flag is set at step #17 to memorize the selection of the focusing Zone C. After execution of step #17, lens driving is carried out, on the basis of the above defocus amount DFc, at step #18. It is decided at step #19 whether or not the lens is properly in in-focus position. When the lens is in in-focus position at step #19, lens driving stops at step #20, and the program returns to step #4. When the lens has not been in in-focus position yet at step #19, the program goes to step #18, and lens driving is carried out continuously until it is decided at step #18 that the lens is in in-focus position.

When it is satisfied at step #12 that $Y_{MB} < Ys$, it is decided that the image on the focusing Zone B is not "low-contrast", and the program goes to step #21. At step #21, comparison between $Y_{MC}$ and Ys is made. When it is satisfied at step #21 that $Y_{MC} \geq Ys$, it is decided that the image on the focusing Zone C is "low-contrast". This case means the detectable object is existing only in the focusing Zone B, so that the program advances to step #22, and the arithmetic of the defocus amount $DF_B$ in Zone B is carried out at step #22, and the Zone A flag is reset at step #23, and the Zone B flag indicating the selecting of Zone B is set at step #24 to memorize the selection of the focusing Zone B. In order to carry out lens driving, the program goes to step #18, and lens driving is carried out at step #18 on the basis of the above defocus amount $DF_B$. It is decided at step #19 whether or not the lens is in in-focus position. When it is decided at step #19 that the lens is in in-focus position, the program advances to step #20 Lens driving stops at step #20, and the program returns to step #4. When it is decided at step #19 that the lens has not been in in-focus position yet, the program goes to step #18, and lens driving is carried out continuously until it is decided at step #18 that the lens is in in-focus position.

When it is satisfied at step #21 that $Y_{MC} < Ys$, it means the detectable objects are existing in both focusing Zones B and C. Therefore, it is necessary to decide which Zone B or C may be selected. Then, the program goes to step #101 shown in FIG. 10. At step #101 and #102, the arithmetic of each defocus mount $DF_B$ and $DF_C$ corresponding to Zones B and C is carried out respectively. Then, it is decided which of Zone B or C is selected. Whereas, there are some ways for a zone-selection available as a decision manner. Namely, one way is to select the focusing zone of which the defocus amount is smaller than the other, or another way is to select the focusing zone of which the defocus amount is larger than the other. Of course, there might be any another ways available. However, the selection way which is applied to this embodiment is to select the focusing zone of which the absolute value of a defocus amount is smaller than the other. Namely, the object which image is located closest to a position of the focusing lens at that moment is selected, and the below-mentioned explanation is described under the above manner. Under the abovementioned rule, the comparison between $|DF_B|$ and $|DF_C|$ is made at step #103. In case it is satisfied at step #103 that $|DF_B| > |DF_C|$, the focusing Zone C must be selected, and the Zone A flag is reset at step #104, and then the Zone C flag is set at step #105. At step #106, lens driving is carried out, on the basis of the defocus amount $DF_C$. At step #107, it is decided whether the lens is in in-focus position or not. When it is decided at step #107 that the lens is in in-focus position, the program advances to step #108, and lens driving stops at step #108, and the program returns to step #4. When it is decided at step #107 that the lens has not been in in-focus position yet, the program goes to step #106, and lens driving will be carried out until it is decided at step #106 that the lens is in in-focus position. In case it is satisfied at step #103 that $|DF_B| \leq |DF_C|$, the focusing Zone B must be selected, and the Zone A flag is reset at step #109, and the Zone B flag is set at step #110. Then, the program goes to step #106. At step #106, lens driving is carried out on the basis of the defocus amount $DF_B$. At step #107, it is decided whether the lens is in in-focus position or not. When it is decided at step #107 that the lens is in in-focus position, the program advances to step #108, and lens driving stops at step #108, and the program returns to step #4. Of course, if it is decided at step #108 that the lens has been not in in-focus position yet, lens driving is carried out continuously until being in in-focus position as abovementioned.

Referring back to FIG. 9A, when it is satisfied at step #8 that $Y_{MA} < Ys$, it means that the detectable object is existing in Zone A. Accordingly, the program goes to step #25 shown in FIG. 9C, and the arithmetic of the defocus amount $DF_A$ in Zone A is carried out at step #25. Then, comparison between the absolute value of the above defocus amount $DF_A$ and the absolute value of the specific setting value$DF_S$ is made at step #26. The purpose of this comparison about the defocus amount is to detect a sudden change of distance between the object and the photographic lens. One occasion as the above to be considered during normally photographing is, for example, a case that an object is a person who is playing sports. Namely, the object suddenly moves and is beyond a focusing zone, and another detectable object may be left in a background. If the defocus amount has suddenly changed, it is assumed that the object moves and is beyond the focusing zone. Under such assumption, the embodiment enables a photographer to bring the object into in-focus position.

Namely, in case it is satisfied at step #26 that $|DF_A| \leq |DF_S|$, it must be considered that the object moves forward or backward a little bit. In order to chase this object, a small area mark is indicated in the view-finder at step #36, and lens driving is carried out, on the basis of the defocus amount $DF_A$, at step #37. It is decided at step #38 whether the lens is in in-focus position or not. When it is decided at step #38 that the lens is in in-focus position, the program advances to step

39, and lens driving stops at step #39, and the program returns to step #4. When it is decided at step #38 that the lens has not been in in-focus position yet, the program goes to step #37, and lens driving will be carried out until it is decided at step #38 that the lens is in in-focus position, then lens driving stops at step #39. Then, the program goes to step #4.

In case it is satisfied at step #26 that $|DF_A| > |DF_S|$, it is assumed that the object moves sideways and is beyond the focusing Zone A and the arithmetic of the defocus amount corresponding to an object as a background is carried out, and the program advances to step #27 in order to bring the object into in-focus position even in this case. The arithmetic of the correlative amount $Y_{MB}$ in Zone B is carried out at step #27, and then, the arithmetic of the correlative amount $Y_{MC}$ in Zone C is carried out at step #28. After the execution of the above arithmetic, the program advances to step #29. At step #29, comparison between $Y_{MB}$ and Ys(the specific setting value) is made. When it is satisfied at step #29 that $Y_{MB} \geq Ys$, the program advances to step #30, and comparison between $Y_{MC}$ and Ys is made at step #30. When it is satisfied at step #30 that $Y_{MC} \geq Ys$, it is decided the detectable object exists only in the focusing Zone A. consequently, it is impossible to be focused to the abovementioned object which has moved sideways. Accordingly, the program goes to step #36, and the small area mark is indicated in the view-finder at step #36, i.e., shifting a focusing zone to Zone A, in order to be focused to the detectable object, and lens driving is carried out at step #37, and the program advances to step #38. It is decided at step #38 whether the lens is in in-focus position or not. When it is decided at step #38 that the lens is in in-focus position, the program advances to step #39, and lens driving stops at step #39, and the program return to step #4. And indication in the view-finder, naturally, has been left as it is, that is, the small area mark remains.

When it is satisfied at step #30 that $Y_{MC} < Ys$, it means that the detectable objects exist in both focusing Zones A and B. Accordingly, the program advances to step #31, and the arithmetic of the defocus amount $DF_C$ of Zone C is carried out at step #31. Then, it is decided which of focusing Zones A or C must be selected by the following condition at step #32. In case it is satisfied at step #32 that $|DF_C| > |DF_A|$, it means that the object in the focusing Zone A has moved less than the object in the focusing Zone C. Therefore, it is assumed that the aimed object has moved forward or backward within Zone A, and the focusing Zone A must be selected. Namely, the program goes to step #36, and the small area mark is indicated in the view-finder at step #36, and lens driving is carried out at step #37, and it is decided at step #38 whether or not the lens is in in-focus position. After deciding that the lens is in in-focus position at step #38, the program advances to step #39, and lens driving stops at step #39, and the program returns to step #4. In case it is satisfied at step #32 that $|DF_C| \leq |DF_A|$, it is assumed that the aimed object has moved sideways from the focusing Zone A to the focusing Zone C. In this case, in order to chase the object which has moved sideways, the focusing Zone C must be selected. Accordingly, the program advances to step #33, and the larger area mark is indicated in the view-finder at step #33, and the Zone A flag is reset at step #34, and the Zone C flag is set at step#35. After setting the Zone C flag, the program goes to step #18 shown in FIG. 9B, and lens driving is carried out at step #18, and it is decided at step #19 whether or not the lens is in in-focus position. When it is decided at step #19 that the lens is in in-focus position, the program advances to step #20, and the lens driving stops at step #20, and the program returns to step #4.

Figure 9A:
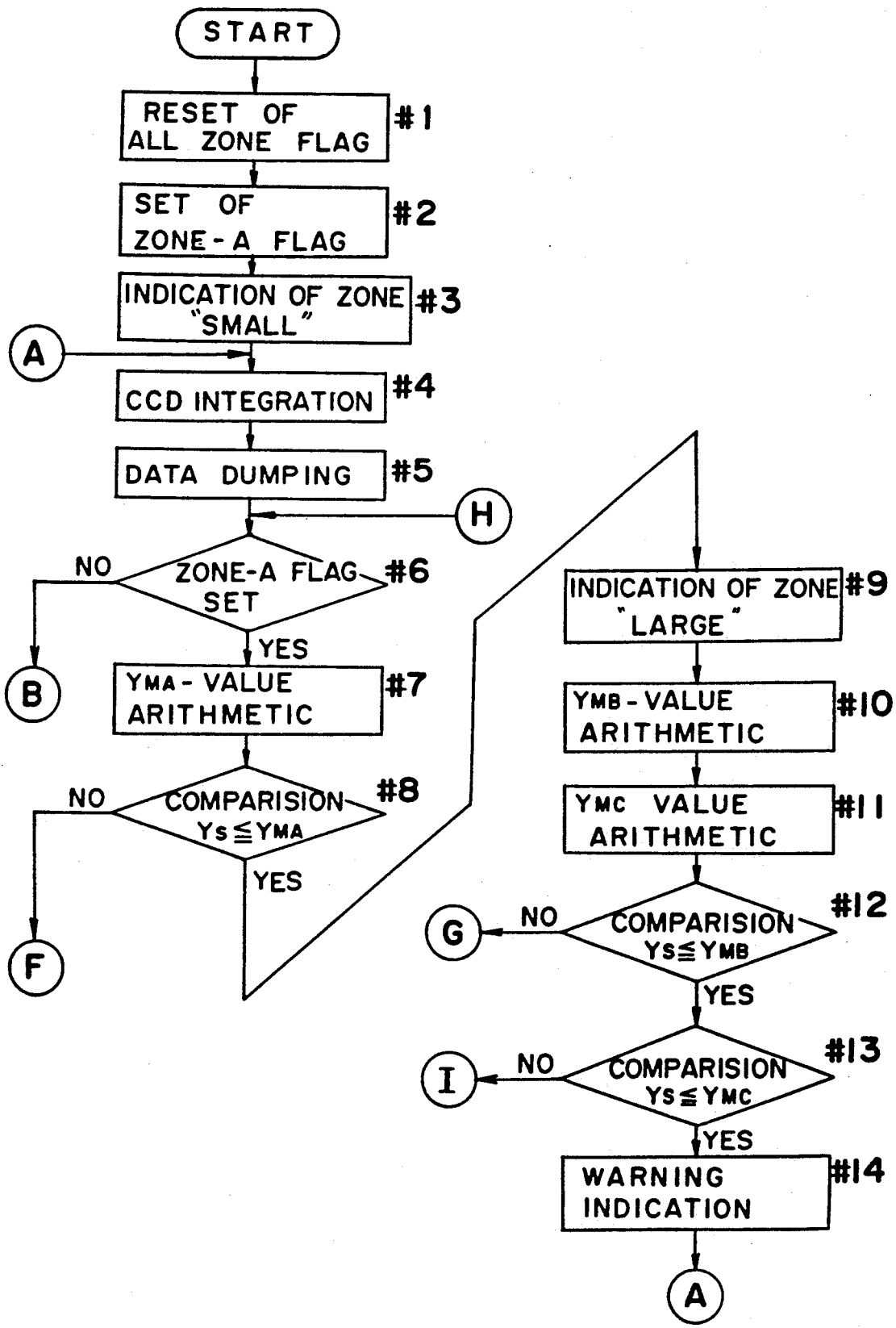
FIGS. 9A through 13C are flow charts showing an operation of the above video-camera.
Figure 9B:
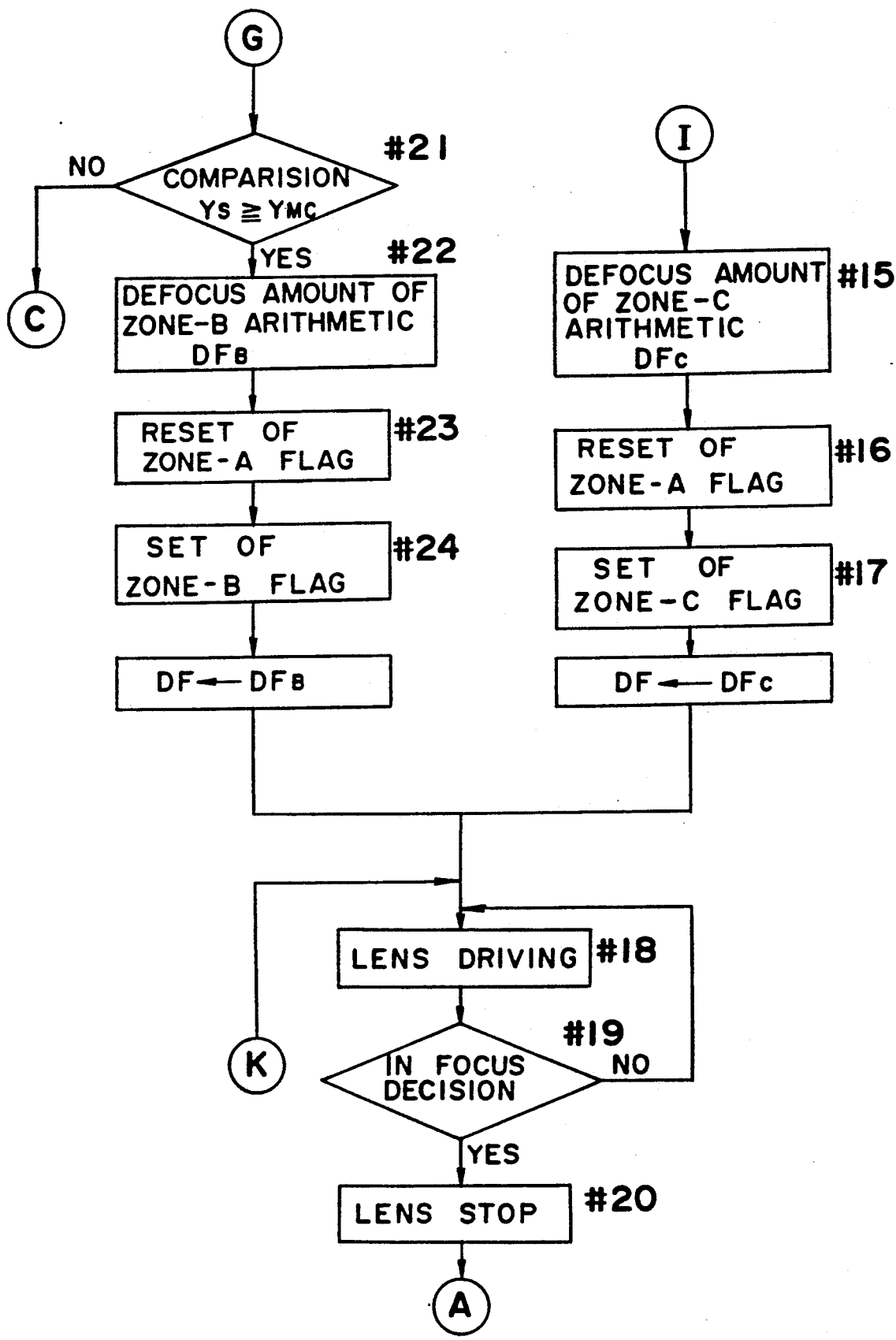
Figure 9C:
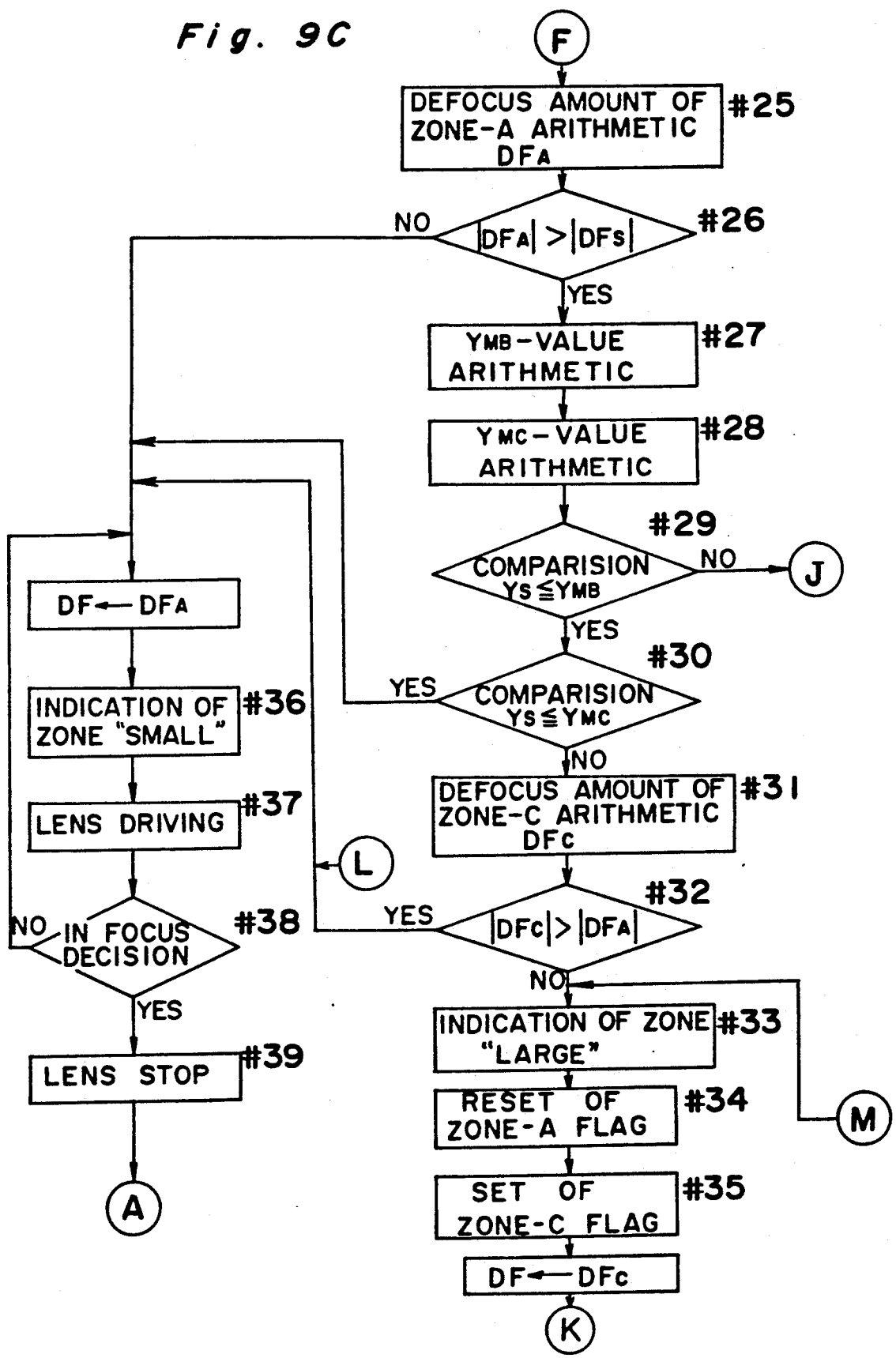
Figure 9D:
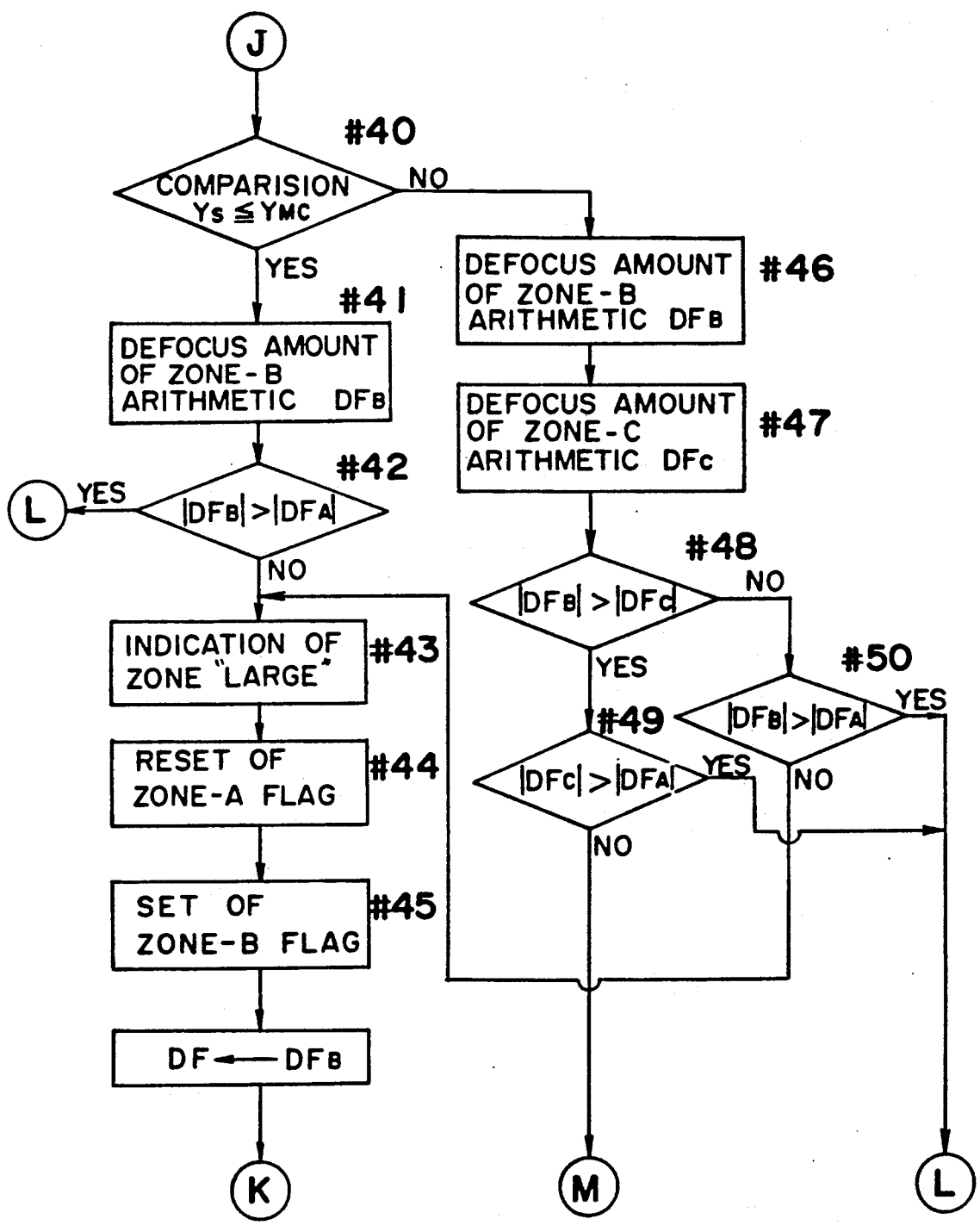
Figure 10:
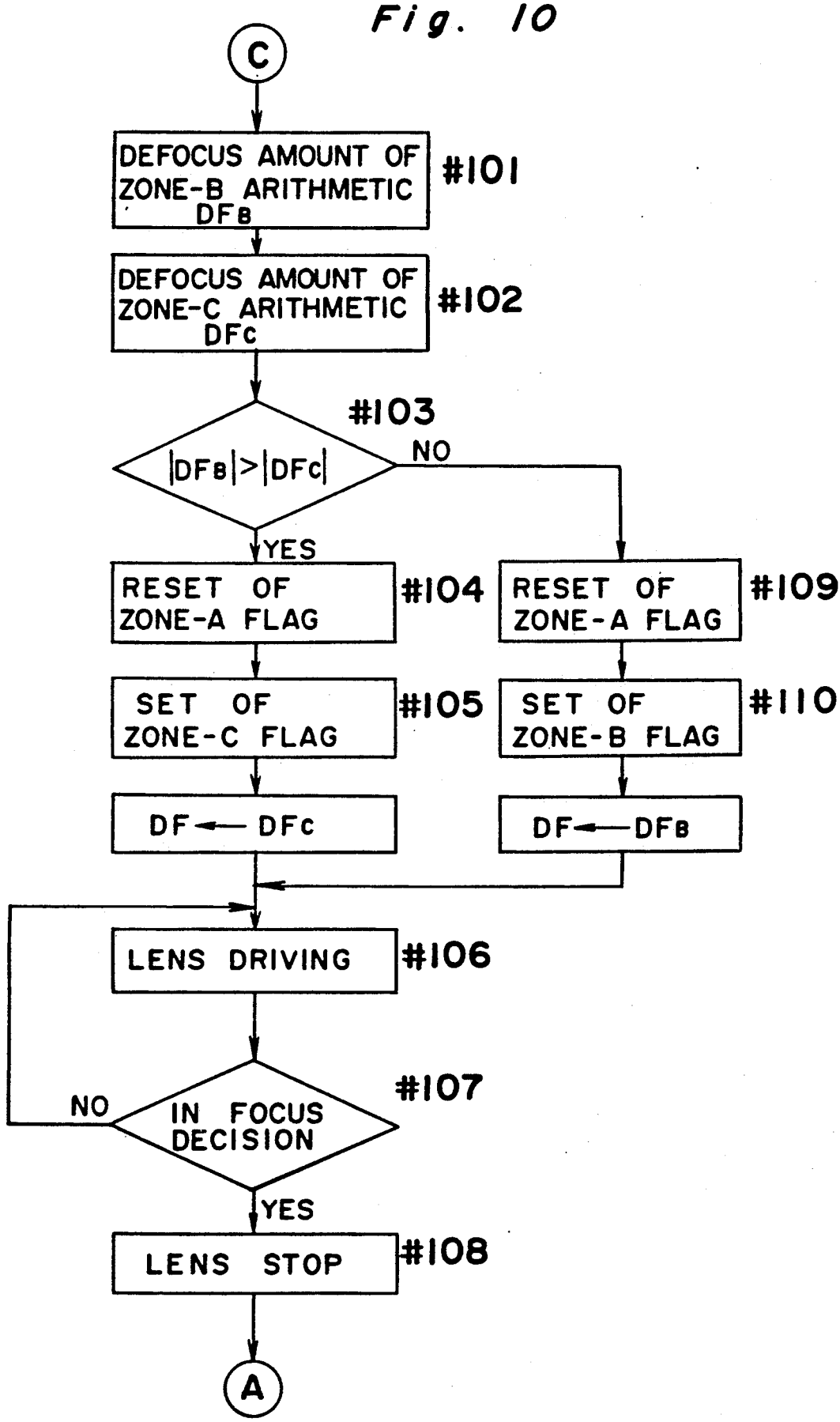

When it is satisfied at step #29 shown in FIG. 9C that $Y_{MB} < Ys$, the program advances to step #40 shown in FIG. 9D. At step #40, comparison between $Y_{MC}$ and Ys, i.e., "low-contrast checking of Zone C", is made. When it is satisfied at step #40 that $Y_{MC} \geq Ys$, it means that the detectable objects do not exist in the focusing Zone C but exist in both focusing Zones A and B. Accordingly, the program advances to step #41, and the arithmetic of the defocus amount $DF_B$ of Zone B is carried out at step #41, and then it is decided at step #42 which of Zones A or B will be selected. In case it is satisfied at step #42 that $|DF_B| > |DF_A|$, it is assumed that the object has moved forward or backward within the focusing Zone A, and the focussing Zone A must be selected. Namely, the program goes to step #36 shown in FIG. 9C, and the small area mark is indicated in the view-finder at step #36, and lens driving is carried out at step #37, and the program advances to step #38. It is at step #38 whether or not the lens is in in-focus position. When it is decided that the lens is in in-focus position, the program advances to step #39, and lens driving stops at step #39, and the program returns to step #4. In case it is satisfied at step #42 shown in FIG. 9D that $|DF_B| \leq |DF_A|$, it is assumed that the object has moved sideways from the focusing Zone A to the focusing Zone B, and the focusing Zone B must be selected. Accordingly, the program advances to step #43, and the large area mark is indicated in the view-finder at step #43, and the Zone A flag is reset at step #44, and the Zone B flag is set at step #45, and the program goes to step #18 shown in FIG. 9B, and lens driving is carried out on the basis of the defocus amount $DF_B$ of the focusing Zone B at step #18, and the program advances to step #19. It is decided at step #19 whether or not the lens is in in-focus position. When it is decided that the lens is in in-focus position, the program advances to step #20, and lens driving stops at step #20, and the program returns to step #4.

When it is satisfied at step #40 shown in FIG. 9D that $Y_{MC} < Ys$, it means that the detectable objects exist in all the focusing Zones A, B and C. Therefore, one focussing zone out of the abovementioned three focusing Zones A, B and C must be selected. First, the program goes to step #46 and the arithmetic of the defocusing amount $DF_B$ as to the object in the focusing Zone B is carried out at step #46. Secondly, the arithmetic of the defocusing amount $DF_C$ as to the object in the focusing Zone C is carried out at step #47. Thirdly, comparison between two absolute values of the abovementioned each defocus amount; $|DF_B|$ and $|DF_C|$ is made at step #48. This purpose is to select the object which image is located closer to a position of the focusing lens at the moment. This is on the basis of the concept that an object can not suddenly change its position to the video-camera. In case it is satisfied at step #48 that $|DF_B| > |DF_C|$, the focusing Zone C must be selected once, and besides, comparison between $|DF_C|$ and $|DF_A|$ is made at step #49. In case it is satisfied at step #49 that $|DF_C| > |DF_A|$, it is assumed that the object in the focusing Zone A has moved slightly forward or backward. In order to be focused within the focusing Zone A without any interruption, the program goes to step #36 shown in FIG. 9C, and the small area mark is indicated in the view-finder at step #36, and lens driving on the basis of the defocus amount $DF_A$ is carried out at step #37, and the program advances to step #38. It is decided at step #38 whether or not the lens is in in-focus position. When it is decided that the lens is in in-focus position, the program advances to step #39, and lens driving stops at step #39, and the program returns to step #4. In case it is satisfied at step #49 shown in FIG. 9D that $|DF_C| \leq |DF_A|$, it is assumed that the object being in the focusing Zone A has moved sideways and gets into the focussing Zone C, and the focusing Zone C must be selected. Thereupon, the program goes to step #33 shown in FIG. 9C, and the larger area mark is indicated in the view-finder at step #33.

After changing the indication in the view-finder, the Zone A flag is reset at step #34, and the Zone C flag is set at step #35. Thereafter, the program goes to step #18 shown in FIG. 9B, and lens driving on the basis of the defocus amount $DF_C$ is carried out at step #18, and the program advances to step #19. It is decided at step #19 whether or not the lens is in in-focus position. When it is decided that the lens is in in-focus position at step #19, the program advances to step #20, and lens driving stops at step #20, and the program returns to the step #4. In case it is satisfied at step #48 shown in FIG. 9D that $|DF_B| \leq |DF_C|$, the program goes to step #50, and comparison between $|DF_B|$ and $|DF_A|$ is made at step #50 after the focusing Zone B is selected once. In case it is satisfied step #50 that $|DF_B| > |DF_A|$, it is assumed that the object has moved forward or backward within the focusing Zone A. In order to be focused within the same Zone A, the program goes to step #36 shown in FIG. 9C without any interruption, and the small area mark is indicated in the view-finder at step #36, and lens driving basing on the defocus amount $DF_A$ at step #37, and the program advances to step #39. It is decided at step #38 whether or not lens is in in-focus position. When it is decided at step #38 that the lens is in in-focus position, the program advances to step #39, and lens driving stops at step #39, and the program returns to step #4 shown in FIG. 9A.

Next, the following description, hereinafter, is described about the case that the Zone A flag is not set at step #6, that is, checking whether or not the Zone A flag is set, shown in FIG. 9A. In other words, it means that the preceding focus detecting operation has been carried out at any other focusing zones except the focusing Zone A. In case the Zone A flag is not confirmed at step #6, the program goes to step #201 shown in FIG. 11A, and it is checked at step #201 whether or not the Zone B flag is set. When the Zone B flag is set, i.e., the focusing zone which was applied directly before is the focusing Zone B, the program advances to step #202, and the arithmetic of the correlative amount of Zone B is carried out at step #202. And then, the comparison between $Y_{MB}$ and Ys, so-called "low-contrast checking", is made at step #203. When it is satisfied at step #203 that $Y_{MB} \geq Ys$, it means no detectable object in the focusing Zone B exists. Accordingly, it must be necessary to examine other focusing zones, thereon the arithmetic of the correlative amount for both focusing Zones A and B is carried out at step #204 and #205 respectively. Thirdly, so-called "low-contrast checking" of Zone A is carried out at step #206. When it is satisfied at step #206 that $Y_{MA} \geq Ys$, further "low-contrast checking" of Zone C is carried out at step #207.

When it is satisfied at step #207 that $Y_{MC} \geq Ys$, the detactable objects do not exist in any Zones A, B and C. Consequently, the program advances to step #208, and the Zone B flag is reset at step #208, and the Zone A flag is set again at step #209, and the program advances to step #210. At step #210, warning indication is made, and the program returns to step #4 in FIG. 9A. When it is satisfied at step #207 shown in FIG. 11A that $Y_{MC} < Ys$, it means the detectable object exists only in the focusing Zone C. Accordingly, the program goes to step #211, and the arithmetic of the defocus amount $DF_C$ of Zone C is carried out at step #211, and the Zone B flag is reset at step #212, and the Zone C flag is set at step #213, and lens driving, on the basis of the defocus amount $DF_C$, is carried out at step #214, and the program advances to step #215. It is decided at step #215 whether or not the lens is in in-focus position. When it is decided at step #215 that the lens is in in-focus position, the program advances to step #216, and lens driving stops at step #216, and the program returns to step #4 in FIG. 9A.

Figure 11A:
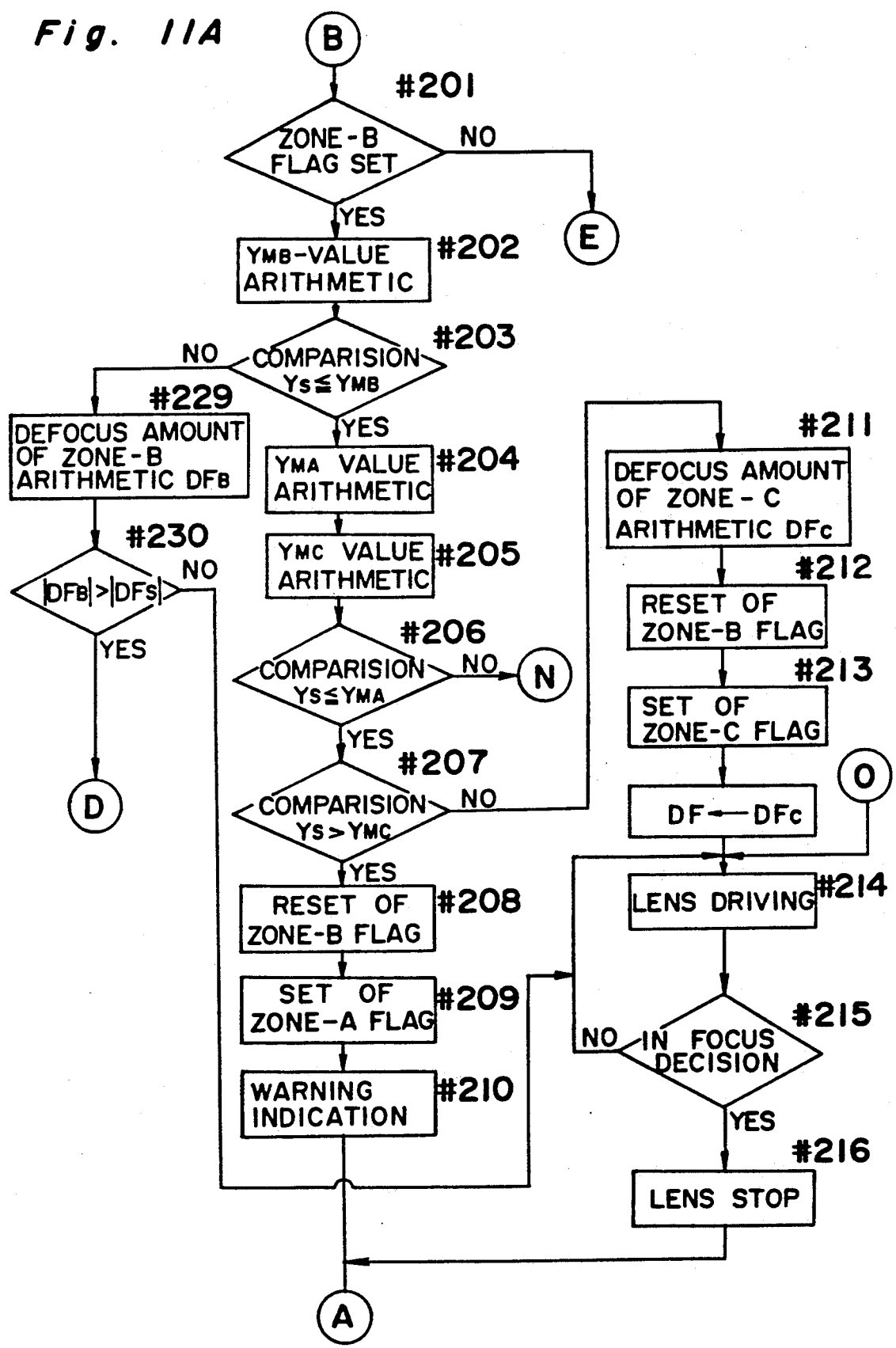
Figure 11B:
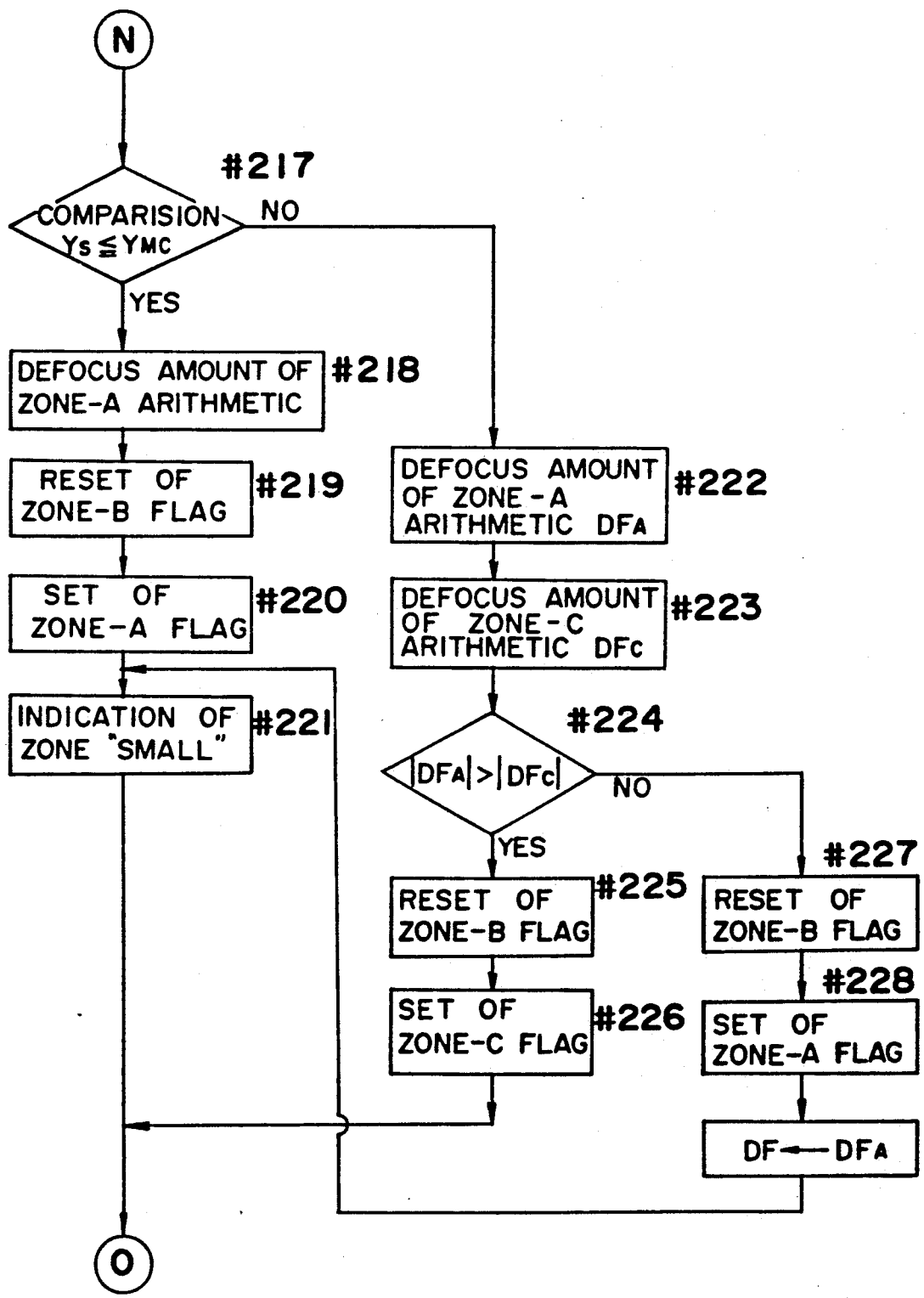

When it is satisfied at step #206 shown in FIG. 11A that $Y_{MA} < Ys$, the program goes to step #217 shown in FIG. 11B, and "low-contrast checking" of Zone C is carried out at step #217. When it is satisfied at step #217 that $Y_{MC} \geq Ys$, it means that the detectable object exists only in the focusing Zone A. Thereupon, the program advances to step #218, and the arithmetic of the defocus amount $DF_A$ of Zone A is carried out at step #218, and the Zone B flag is reset at step #219, and the Zone A flag is set at step #220, and the small area mark is indicated in the view-finder at step #221, and the program goes to step #214 shown in FIG. 11A, and lens driving, on the basis of the defocus amount $DF_A$, is carried out at step #214, and the program advances step #215. It is decided at step #215 whether or not the lens is in in-focus position When it is decided at step #215 that the lens is in in-focus position the program advances to step #216, and lens driving stops at step #216, and the program returns to step #4 in FIG. 9A.

When it is satisfied at step #217 shown in FIG. 11B that $Y_{MC} < Ys$, it is assumed that the detectable objects exist in both focusing Zones A and C. Thereupon, the program goes to step #222, and the arithmetic of the defocus amounts $DF_A$ and $DF_C$ corresponding to each Zone A and C is carried out at step #222 and #223 respectively. Then, for selection of the focusing zone, comparison between two absolute values $|DF_A|$, $|DF_C|$ of the above defocus amounts, corresponding to Zone A and C is made at step #224. In case it is satisfied at step #224 that $|DF_A| > |DF_C|$, it is assumed that the object which was in the focusing Zone B just before has moved sideways and is now in the focusing Zone C. Therefore, the program advances to step #225, and the Zone B flag is reset at step #225, and the Zone C flag is set at step #226, and the program goes to step #214 show in FIG. 11A, and lens driving, on the basis of the defocus amount $DF_C$, is carried out at step #214, and the program advances to step #215. It is decided at step #215 whether or not the lens is in in-focus position. When it is decided at step #215 that the lens is in in-focus position, the program advances to step #216, and lens driving stops at step #216, and the program returns to step #4 in FIG. 9A. In case it is satisfied at step #224 shown in FIG. 11B that $|DF_A| \leq |DF_C|$, it is assumed that the object in the focusing Zone B has moved sideways and is now in the focusing Zone A. Therefore, the program goes to step #227, and the Zone B flag is reset at step #227, and the Zone A flag is set at step #228, and the small area mark is indicated in the view-finder, instead of the large area mark at step #221, and the program goes to step #214 shown in FIG. 11A, and lens driving, on the basis of the defocus amount $DF_A$, is carried out at step #214, and the program advances to the step #215. It is decided at step #215 whether or not the lens is in in-focus position. When it is decided that the lens is in in-focus position, the program advances to step #216, and lens driving stops at step #216, and the program returns to step #4 in FIG. 9A.

When it is satisfied at step #203 shown in FIG. 11A that $Y_{MB} < Y_S$, the program goes to step #229, and the arithmetic of the defocus amount $DF_B$ of Zone B is carried out at step #229. Next, the comparison between two absolute value corresponding to the above defocus amount $DF_B$ and the specific setting value $DF_S$, i.e., $|DF_B|$ and $|DF_S|$ at step #230, is made. In case it is satisfied at step #230 that $|DF_B| \leq |DF_S|$, it is assumed that the object in the focusing Zone B has moved forward or backward slightly. Accordingly, the program goes to step #214, and lens driving, on the basis of the defocus amount $DF_B$, is carried out at step #214, and the program advances to step #215. It is decided at step #215 whether or not the lens is in in-focus position. When it is decided that the lens is in in-focus position, the program advances to step #216, and lens driving stops at step #216, and the program returns to step #4 shown in FIG. 9A.

Figure 12A:
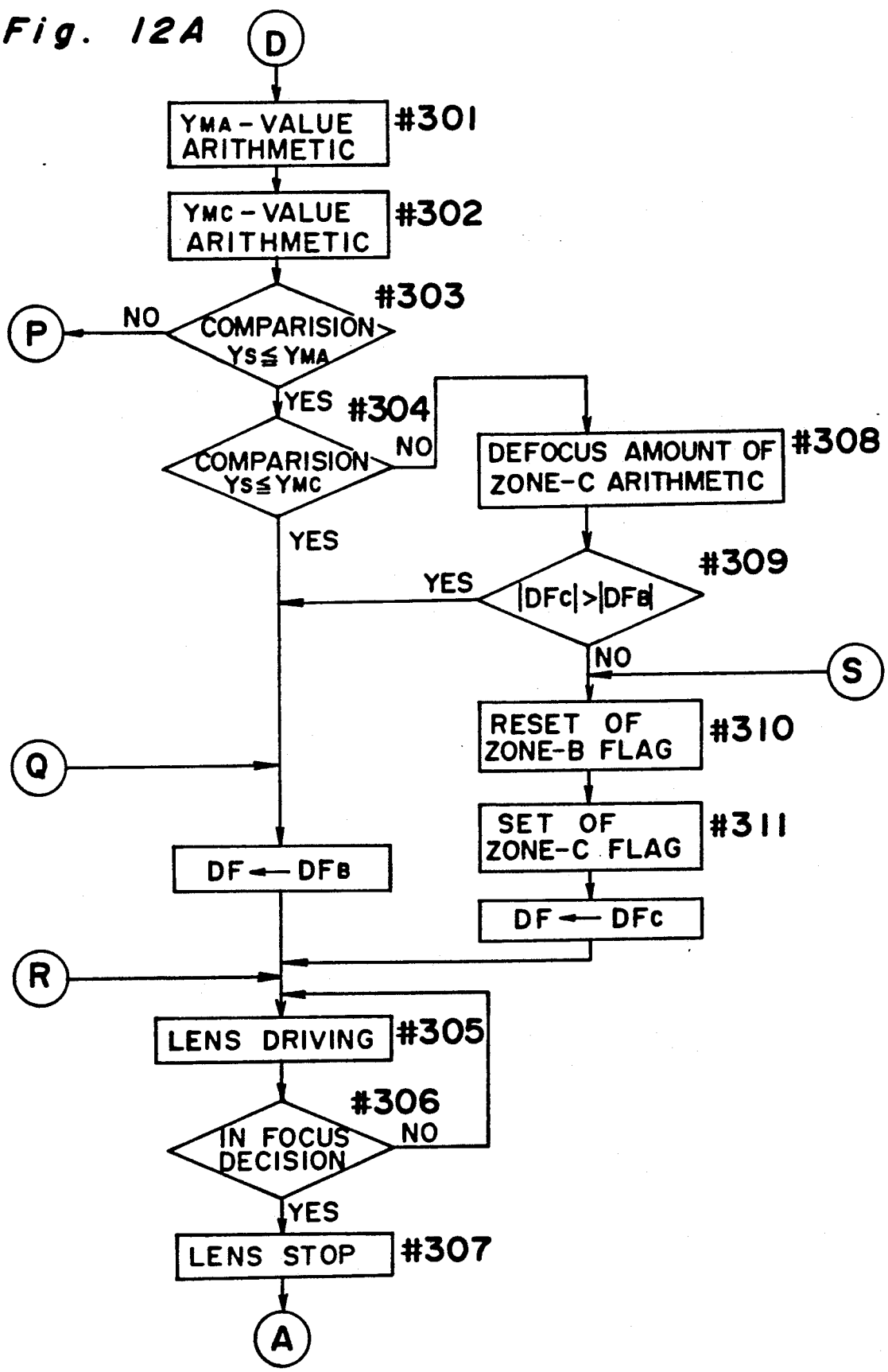

In case it is satisfied at step #230 shown in FIG. 11A that $|DF_B| > |DF_S|$, the program goes to step #301 shown in FIG. 12A, and it must be tried to find out the object in any other focusing zones, assuming that the object in the focusing Zone B has moved to the right or left side direction As can be seen in FIG. 12A, at step #301, the arithmetic of the correlative amount $Y_{MA}$ of Zone A is carried out, and the arithmetic of the correlative amount $Y_{MC}$ is carried out at step #302, and then, "low-contrast checking" of Zone A is carried out at step #303. When it is satisfied at step #303 that $Y_{MA} \geq Y_S$, the program advances to step #304, and then "low-contrast checking" of Zone C is carried out at step #304. When it is satisfied at step #304 that $Y_{MC} \geq Y_S$, it means that there is the detectable object only in the focusing Zone B. Accordingly, the program advances to step #305, and lens driving, on the basis of the defocus amount $DF_B$, is carried out at step #305, and the program advances to step #306. It is decided at step #306 whether or not the lens is in in-focus position. When it is decided that the lens is in in-focus position, the program advances to step #307, and lens driving stops at step #307, and the program returns to step #4 in FIG. 9A.

When it is satisfied at step #304 shown in FIG. 12A that $Y_{MC} < Y_S$, it means that the detectable objects exist in both focusing Zones B and C. Thereupon, the program goes to step #308, and the arithmetic of the defocus amount $DF_C$ is carried out at step #308, and the comparison between two absolute values corresponding to two defocus amounts $DF_B$, $DF_C$ is made at step #309. In case it is satisfied at step #309 that $|DF_C| \leq |DF_B|$, it is assumed that the object being in the focusing Zone B has moved sideways and is now in the focusing Zone C. Accordingly, the program advances to step #310, and the Zone B flag is reset at step #310, and the Zone C flag is set at step #311, and the program goes to step #305, and lens driving, on the basis of the defocus amount $Df_C$, is carried out at step #305, and it is decided at step #306 whether or not the lens is in in-focus position. When it is decided that the lens is in in-focus position, the program advances to step #307, and lens driving stops at step #307, and the program returns to step #4 in FIG. 9A. In case it is satisfied at step #309 that $|DF_C| > |DF_B|$, it means that the object has moved forward or backward in the same zone, i.e., the focusing Zone B. Accordingly, the program advances to step #305, and lens driving, on the basis of the defocus amount $DF_B$, is carried out at step #305 and it is decided at step #306 whether or not the lens is in in-focus position. When it is decided that the lens is in in-focus position at step #306, the program advances to step #307, and lens driving stops at step #307, and the program returns to step #4 in FIG. 9A.

When the condition of "low-contrast checking" of Zone A; $Y_{MA} < Y_S$ is satisfied at step #303, shown in FIG. 12A, the program goes to step #312 shown in FIG. 12B. At step #312, "low-contrast checking" of the focusing Zone C is carried out. When it is satisfied at step #312 that $Y_{MC} \geq Y_S$, it means that the detectable objects exist in both focusing Zone B and A. Accordingly, the program advances to step #313, and the arithmetic of the defocus amount $DF_A$ of the focusing Zone A is carried out at step #313. Then, at step #314, the comparison between $|DF_A|$ and $|DF_B|$ is made. In case it is satisfied at step #314 that $|DF_A| > |DF_B|$, it is assumed that the detectable object has moved forward or backward in the same zone; the focusing Zone B, and the program goes to step #305, and lens driving, on the basis of the defocus amount $DF_B$, is carried out at step #305, and it is decided at step #306 whether or not the lens is in in-focus position. When it is decided at step #306 that the lens is in in-focus position, the program advances to step #307, and lens driving stops at step #307, and the program returns to step #4 in FIG. 9A. In case it is satisfied at step #314 shown in FIG. 12B that $|DF_A| \leq |DF_B|$, it is assumed that the objective being in the focusing Zone B has moved sideways and is now in the focusing Zone A. Accordingly, the program advances to step #315, and at step #315, the small area mark is indicated in the view-finder, and the Zone B flag is reset at step #316, and the Zone A flag is set at step #317. In order to carry out lens driving, the program goes to step #305 in FIG. 12A, and on the basis of the defocus amount $DF_A$, lens driving is carried out at step #305, and it is decided at step #306 whether or not the lens is in in-focus position. When it is decided at step #306 that the lens is in in-focus position, the program advances to step #307, and lens driving stops at step #307, and the program returns to step #4 in FIG. 9A.

When the condition of "low-contrast checking" of the focusing Zone C; $Y_{MC} < Y_S$ is satisfied at step #312 shown in FIG. 12B, it means that the detectable objects must exist in all the focusing Zones A, B and C. Accordingly, the program goes to step #318, and at step #318 and #319, the arithmetic of the defocus amounts $DF_A$, $DF_C$ of the focusing Zone A and C is carried out respectively, and the comparison between $|DF_A|$ and $|DF_C|$ is made at step #320. In case it is satisfied at step #319 that $|DF_A| > |DF_C|$, after shifting the focusing Zone C once, the program advances to step #321, and the comparison between $|DF_C|$ and $|DF_B|$ is made at step #321. In case it is satisfied at step #321 that $|DF_C| > |DF_B|$, it is assumed that the object being in the focusing Zone B has moved forward or backward in the same zone. Then, in order to carry out lens driving, the program goes to step #305 shown in FIG. 12A. At step #305, on the basis of the defocus amount $DF_B$, lens driving is carried out, and it is decided at step #306 whether or not the lens is in in-focus position. When it is decided at step #306 that the lens is in in-focus position, lens driving stops at step #307, and the program returns to step #4 in FIG. 9A. In case it is satisfied at step #321 shown in FIG. 12B that $|DF_C| < |DF_B|$, it is assumed the object being in the focusing Zone B has moved sideways and is now in the focusing Zone C. Accordingly, the program goes to step #310 shown in FIG. 12A, and at step #310, the Zone B flag is reset, and the Zone C flag is set at step #311. Then, in order to carry out lens driving, the program goes to step #305. At step #305, on the basis of the defocus amount $DF_C$, lens driving is carried out, and it is decided at step #306 whether or not the lens is in in-focus position. When it is decided at step #306 that the lens is in in-focus position, the program advances to step #307, and lens driving stops at step #307, and the program returns to step #4 in FIG. 9A. In case it is satisfied at step #320 shown in FIG. 12B that $|DF_A| \leq |DF_C|$, after shifting the focusing Zone A once, the program goes to step #322, and comparison between $|DF_A|$ and $|DF_B|$ is made at step #322. In case it is satisfied at step #322 that $|DF_A| > |DF_B|$, it is assumed that the object being in the focusing Zone B has moved forward or backward within the same zone. Accordingly, in order to carry out lens driving, the program goes to step #305 in FIG. 12A. At step #305 lens driving, on the basis of the defocus amount $DF_B$, is carried out, and it is decided at step #306 whether or not the lens is in in-focus position. When it is decided at step #306 that the lens is in in-focus position, the program advances to step #307, and lens driving stops at step #307, and the program returns to step #304 in FIG. 9A.

Figure 12B:
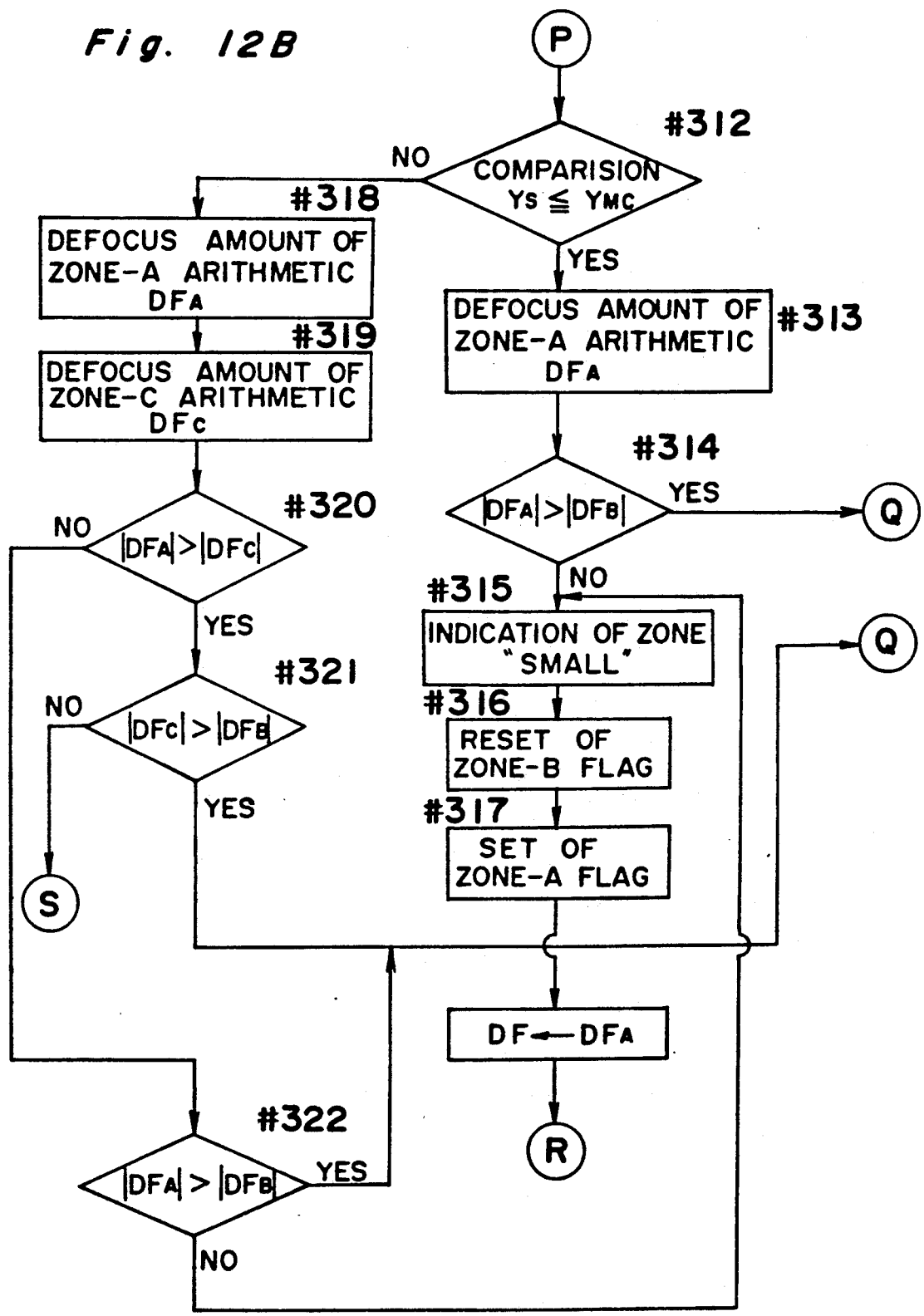

In case it is satisfied at step #322 shown in FIG. 12B that $|DF_A| \leq |DF_B|$, it is assumed that the object being in the focusing Zone B has moved sideways and is now in the focusing Zone A. Accordingly the program goes to step #315, and at step #315, indication in the viewfinder changes from the large area marks to the small area mark, and the Zone B flag is reset at step #316, and the Zone A flag is set at step #317. Then, in order to carry out lens driving, the program goes to step #305 shown in FIG. 12A. At step #305, lens driving, on the basis of the defocus amount $DF_A$, is carried out, and it is decided at step #306 whether or not the lens is in in-focus position. When it is decided at step #306 that the lens is in in-focus position, the program advances to step #307, lens driving stops at step #307, and the program returns to step #4 in FIG. 9A.

Figure 13A:
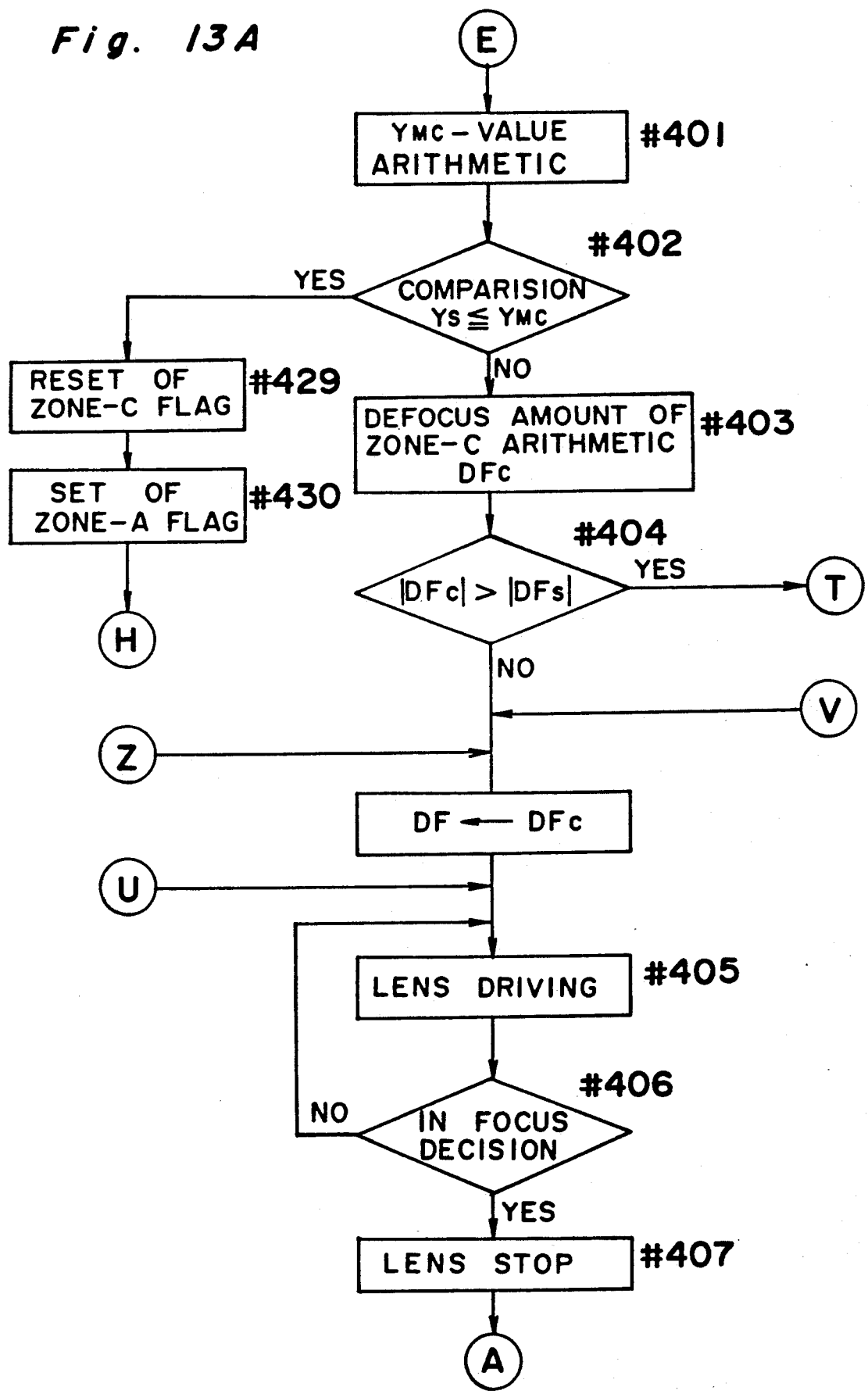

In case the Zone B flag has not been set at step #201, shown in FIG. 11A, i.e., the flags of both Zones A and B have not been set, it is just considered that the Zone C flag has been set, and the program goes to step #401 shown in FIG. 13A. So, the operation under such a case is described hereinafter, referring to FIG. 13A through 13C. At step #401 shown in FIG. 13A, the arithmetic of the correlative amount $Y_{MC}$ of Zone C is carried out. Then, at step #402, "low-contrast checking" of Zone C, i.e., comparison between $Y_{MC}$ and Ys, is made. When it is satisfied at step #402 that $Y_{MC} \geq Ys$, there is no detectable object in the focusing Zone C, so that the program goes to step #429, and the Zone C flag is reset at step #429, and the Zone A flag is set at step #430. And the program return to step #6 in FIG. 9A, and at step #6, it is tried again to find out a detectable object which exists in any focusing Zone A, B or C. While this embodiment is designed to carry out the arithmetic of other focusing zones by the data which has been stored once, it may be designed to detect a video-camera by returning to step #4; CCD intergration, shown in FIG. 9A.

When it is satisfied at step #402 that $Y_{MC} < Ys$, it means the detectable object exists in the focusing Zone C. Accordingly, the program advances to step #403. At step #403, the arithmetic of the defocus amount $DF_C$ of the focusing Zone C is carried out, and then, the comparison between $|DF_C|$ and $DF_S|$ is made at step #404. In case it is satisfied at step #404 that $|DF_C| \leq |DF_S|$, it is assumed that the objective being in the focusing Zone C has moved slightly forward or backward in the same zone. Accordingly, in order to carry out lens driving, the program advances to step #405, and at step #405, lens driving, on the basis of the defocus amount $DF_C$, is carried out, and it is decided at step #406 whether or not the lens is in in-focus position. When it is decided at step #406 that the lens is in in-focus position, the program advances to step #407, and lens driving stops at step #407, and the program returns to step #4 in FIG. 9A. In case it is satisfied at step #404 that $|DF_C| > |DF_S|$, it means there is possibility that the object has moved into other focusing zones since the distance between the object in the focusing Zone C and the photographic lens has changed so much. Accordingly, the program goes to step #408 shown in FIG. 13B, and at step #408, the arithmetic of the correlative amount $Y_{MA}$ of Zone A is carried out, and then the arithmetic of the correlative amount $Y_{MB}$ of Zone B is carried out at step #408, and the program advances to step #410. At step #410, "low-contrast checking" of Zone A; i.e., the comparison between $Y_{MA}$ and Ys, is made. When it is satisfied at step #410 that $Y_{MA} \geq Ys$, the program advances to step #411. At step #411, "low-contrast checking" of Zone B, i.e., the comparison between $Y_{MB}$ and Ys, is made. In case it is satisfied at step #411 that $Y_{MB} \geq Ys$, it means the detectable object exists only in the focusing Zone C. Therefore, in order to carry out lens driving, the program goes to step #405 shown in FIG. 13A, and lens driving is carried out at step #405, and it is decided at step #406 whether or not lens is in in-focus position. When it is decided at step #406 that the lens is in in-focus position, the program advances to step #407, and lens driving stops at step #407 and then the satisfied at step #411 shown in FIG. 13B that $Y_{MB} < Ys$, it means that the detectable objects exist in both focusing Zones C and B. Accordingly, the program advances to step #412, and the arithmetic of the defocus amount $|DF_B$ is carried out at step #412, and then, comparison between $|DF_B|$ and $|DF_C|$ at step #413 is made. In case it is satisfied at step #413 that $|DF_B| > |DF_C|$, assuming that the object being in the focusing Zone C has moved forward or backward within the same zone, the program goes to step #405 shown in FIG. 13A. in order to carry out lens driving. At step #405, lens driving, on the basis of the defocus amount $DF_C$, is carried out, and it is decided at step #406 whether or not lens is in in-focus position. When it is decided at step #406 that lens is in in-focus position, the program advances to step #407, and lens driving stops at step #407, and then the program returns to step #4 shown in FIG. 9A. In case it is satisfied at step #413 shown in FIG. 13B that $|DF_B| \leq |DF_C|$, assuming that the object being in the focusing Zone C has moved into the focusing Zone B, the program advances to step #414. At step #414, the Zone C flag is reset, and the Zone B flag is set at step #415, and the program goes to step #405 shown in FIG. 13A in order to carry out lens driving. At step #405, lens driving, on the basis of the defocus amount $DF_B$, is carried out, and it is decided at step #406 whether or not the lens is in in-focus position. When it is decided at step #406 that the lens is in in-focus position, the program advances to step #407, and lens driving stops at step #407, and the program returns to step #4 in FIG. 9A.

Figure 13B:
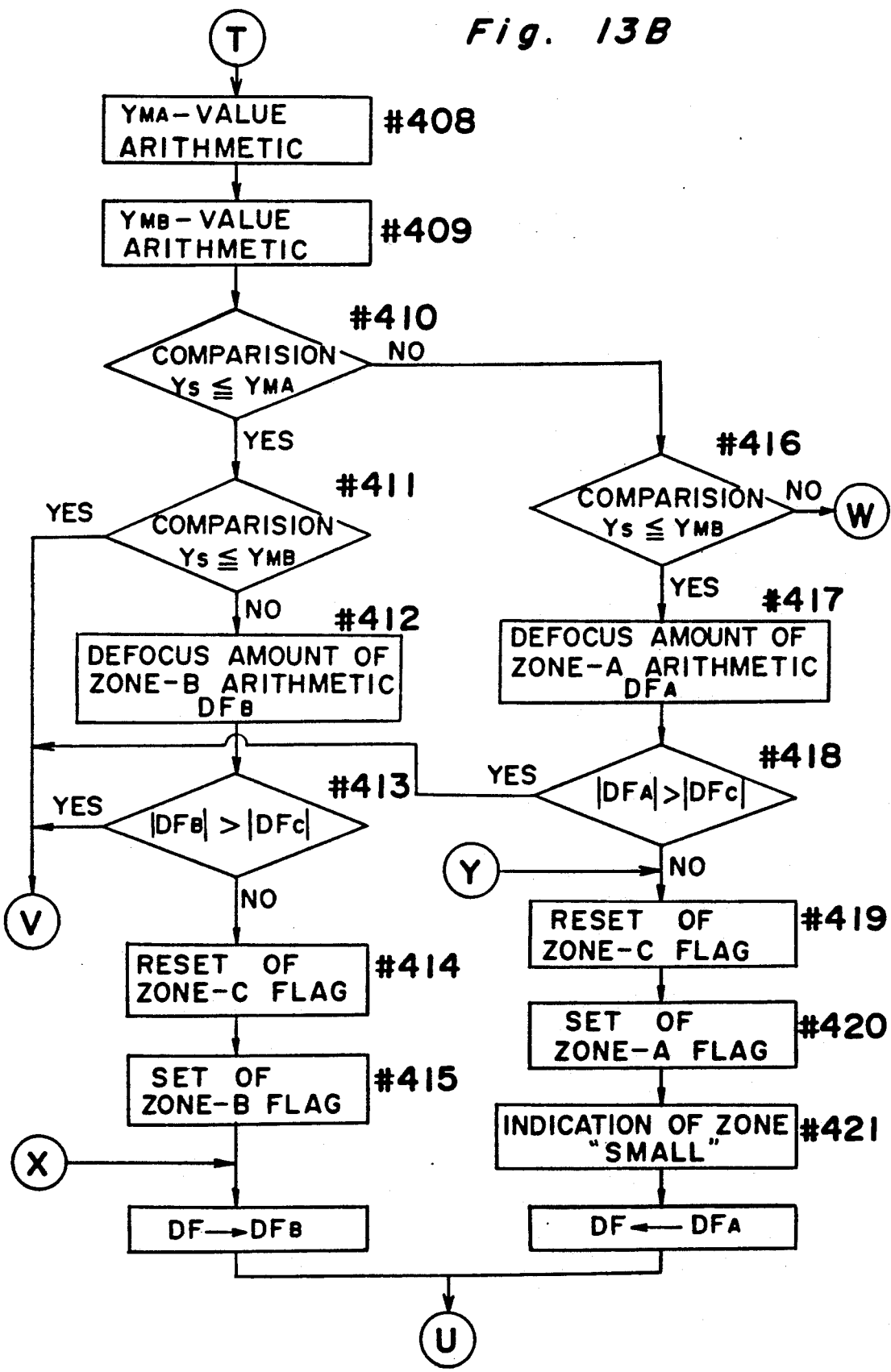

When it is satisfied at step #410 shown in FIG. 13B that $Y_{MA} < Y_S$, i.e., the program goes to step #416. At step #416, "low-contrast checking" of Zone B is made. When it is satisfied at step #416 that $Y_{MB} \geq Y_S$; i.e., it means that the detectable objects exist in both focusing Zones A and C. Accordingly, the program advances to step #417, and the arithmetic of the defocus amount $DF_A$ of Zone A is carried out at step #417, and at step #418, the comparison between $|DF_A|$ and $|DF_C|$ is made. In case it is satisfied at step #418 that $|DF_A| > |DF_C|$, assuming that the object has moved within the focusing Zone C, the program goes to step #405 shown in FIG. 13A in order to carry out lens driving. At step #405, lens driving, on the basis of the defocus amount $DF_C$, is carried out, and it is decided at step #406 whether or not the lens is in in-focus position When it is decided at step #406 that the lens is in in-focus position, the program advances to step #407, and lens driving stops at step #407, and the program returns to step #4 in FIG. 9A.

In case it is satisfied at step #418 shown in FIG. 13B that $|DF_A| < |DF_C|$, assuming that the object being the focusing Zone C has moved into the focusing Zone A, the program advances to step #419. At step #419, the Zone C flag is reset, and the Zone A flag is set at step #420, and then, indication in the view-finder changes from the large area mark to the small area mark at step #421, and the program goes to step #405 shown in FIG. 13A in order to carry out lens driving. At step #405, lens driving, on the basis of the defocus amount $DF_A$, is carried out, and it is decided at step #406 whether or not the lens is in in-focus position. When it is decided at step #406 that the lens is in in-focus position, the program advances to step #407, and lens driving stops at step #406, and then the program returns to step #4 in FIG. 9A.

When it is satisfied at step #416 shown in FIG. 13B, that $Y_{MB} < Y_S$, it means that the detectable objects exist in each focusing Zone A, B and C. Therefore, the program goes to step #422 shown in FIG. 13C, and the arithmetic of the defocus amount $DF_A$ of Zone A is carried out at step #422, and the arithmetic of the defocus amount $DF_B$ is carried out at step #423. And then, the comparison between $|DF_A|$ and $|DF_B|$ is made at step #424. When it is satisfied at step #424 that $|DF_A| > |DF_B|$, after shifting to the focusing Zone B, the program advances to step #425, and the comparison between $|DF_B|$ and $|DF_C|$, is made at step #425. In case it is satisfied at step #425 that $|DF_B| > |DF_C|$, assuming that the object has moved within the focusing Zone C, the program goes to step #405 shown in FIG. 13A in order to carry out lens driving. At step #405, lens driving, on the basis of the defocus amount $DF_C$, is carried out, and it is decided at step #406 whether or not the lens is in in-focus position. When it is decided at step #406 that the lens is in in-focus position, the program advances to step #407, and lens driving stops at step #407, and then, the program returns to step #4 shown in 9A.

Figure 13C:
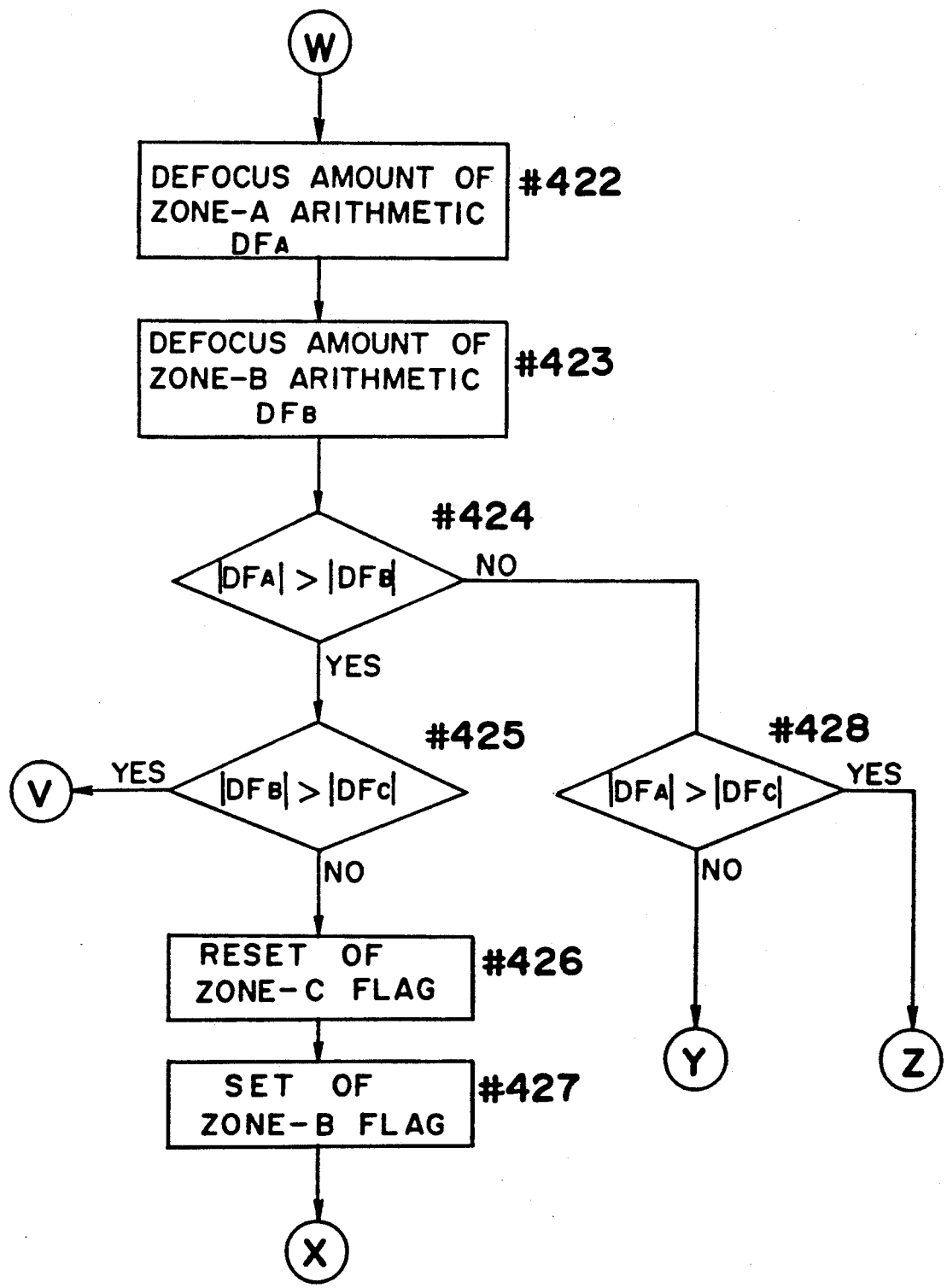

In case it is satisfied at step #425 shown in FIG. 13C that $|DF_B| \leq |DF_C|$, assuming that the object being in the focusing Zone C has moved into the focusing Zone B, the program advance to step #426. At step #426, the Zone C flag is reset and the Zone B flag is set at step #427, and then, the program goes to step #405 shown in FIG. 13A in order to carry out lens driving. At step #405, lens driving, on the basis of the defocus amount $DF_B$, is carried out, and it is decided at step #406 whether or not the lens is in in-focus position. When it is decided at step #406 that the lens is in in-focus position, the program advances to step #407, and lens driving stops at step #407, and then, the program returns to step #4 in FIG. 9A.

When it is satisfied at step #424 shown in FIG. 13C that $|DF_A| \leq |DF_B|$, the program goes to step #428 and then, the comparison between $|DF_A|$ and $|DF_C|$ is made after shifting to the focusing Zone A once. In case it is satisfied at step #428 that $|DF_A| > |DF_C|$, assuming that the object being the focusing Zone C has moved forward or backward within the same zone, the program goes to step #405 shown in FIG. 13A in order to carry out lens driving. At step #405, lens driving, on the basis of the defocus amount $DF_C$, is carried out, and it is decided at step #406 whether or not the lens is in in-focus position. When it is decided at step #406 that the lens is in in-focus position, the program advances to step #407, and lens driving stops at step #407, and the program returns to step #4 in FIG. 9A.

In case it is satisfied at step #428 that $|DF_A| \leq |DF_C|$, assuming that the object being in the focusing Zone C has moved into the focusing Zone A, the program goes to step #419 shown in FIG. 13B. At step #419, the Zone C flag is reset, and the Zone A flag is set at step #420, and indication in the view-finder changes from the large area mark to the small area mark at step #421, and then, the program goes to step #405 shown in FIG. 13A in order to carry out lens driving. At step #405, lens driving, on the basis of the defocus amount $DF_A$, is carried out, and it is decided at step #406 whether or not the lens is in in-focus position. When it is decided at step #406 that the lens is in in-focus position, the program advances to step #407, and lens driving stops at step #407 and the program returns to step #4 shown in FIG. 9A.

As described above, even if the object has moved into the other focusing zone beyond any zone of the three focusing Zones A, B or C, it is ensured to bring the aimed object into in-focus position, if the object exists in any focusing zone among the three focusing Zones A, B and C, without bringing the detectable object in the background into in-focus position.

In the above described embodiment, the program is designed to shift to so-called "chase mode" when the defocus amount of the focusing zone in which the aimed object exists is larger than the specific setting value DFs. In addition, it will be recognized that there are other equivalent ways of achieving an automatic focusing adjustment. For example, there are two operation modes available for the focus detecting operation. One of them is so-called "SAF-mode" at which the same focusing zone is used as far as the contrast of an object never becomes low during photographing, by providing a switch, like the slide-switch 103 for selection of AF-mode shown in FIG. 5B, with a video-camera body if the specific setting value DFs can be changed by the abovementioned switch and the other is so-called "chase-mode" which is described in this embodiment.

Furthermore, there is another operation mode available. That is, using the timer by which timing to return to the central focusing zone again is controlled, it is designed that the central focusing zone is automatically selected by the timer after shifting to the automatic "chase-mode". Thus, the automatic return to the central focusing zone is ensured regardless of the defocus amount.

Accordingly the continuous focus detection would be possible when a photographer put back the object in the central focusing zone while chasing the object which has been left from the central focusing zone for a certain time.

Moreover, although this embodiment is most preferable for the automatic focusing apparatus for use in a video-camera, it is apparent that the apparatus can be used for a camera, such as a single-lens reflex camera having a continuous AF-mode, by which a few still pictures per every second can be successively taken while actuating an automatic focusing system.

Figure 14A:
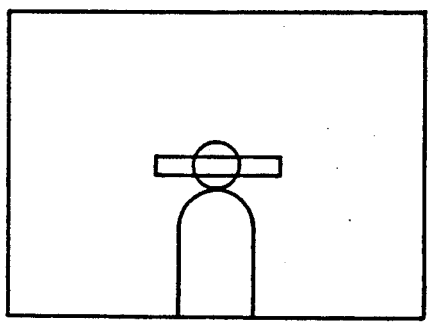
FIG. 14 is explanatory views showing an operation of the focus detecting arrangement of another embodiment according to the present invention.
Figure 14B:
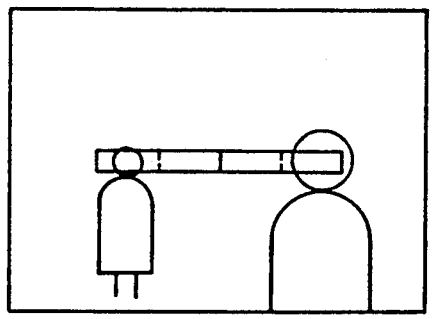
Figure 14C:
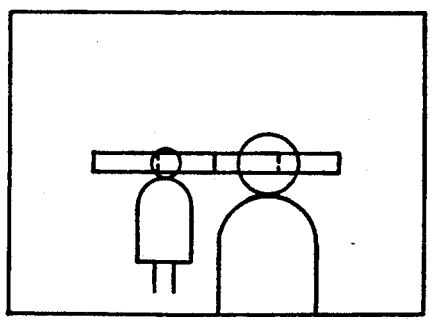
Figure 15A:
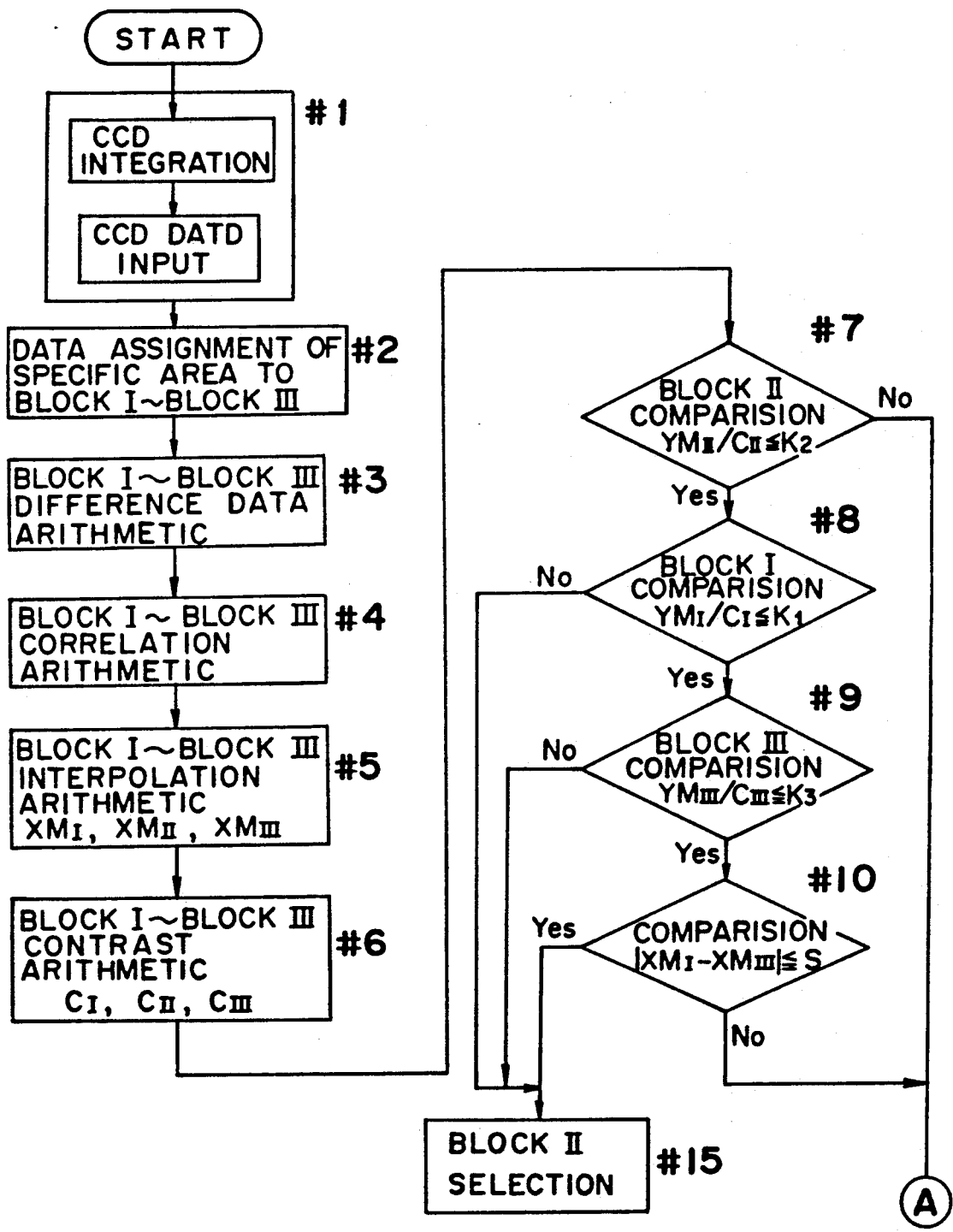
FIGS. 15A and FIG. 15B are flow charts showing an operation of the focus detecting arrangement.
Figure 15B:
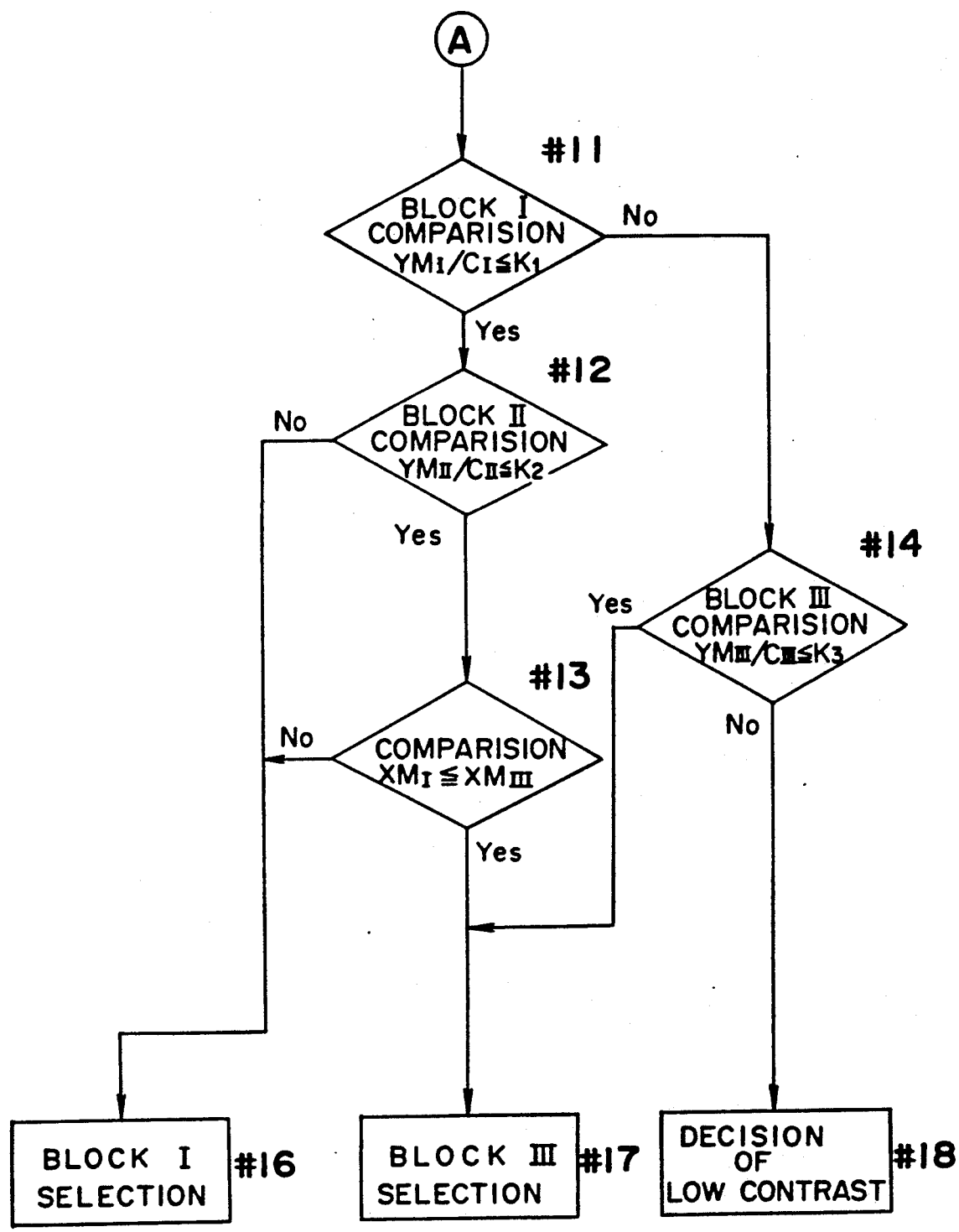

Referring now to FIGS. 14, 15A and 15B, there are shown another embodiment according to the present invention. In this embodiment, the automatic focusing apparatus has two focusing areas which have a different area, and one of the abovementioned two focusing areas is automatically selected subject to a situation of an object. The embodiment will be described in detail, herinafter, by making reference to the above drawings. FIG. 14 is explanatory view showing focus detecting zones which are applied to the embodiment. The focus detecting zones are so designed in this embodiment that it is convenient for a photographer to take a motion-picture with a video-camera, lack of focus detection can be avoided, a state of distance-dismeasuring decreases as much as possible and a structure of a system is simple.

Size of the focus detecting zone at a normal time is shown in FIG. 14(a); figure on the upper side. Size in width of the above focus detecting zone is about one-fourth of size of a photographic area in a horizontal direction. If the focus detecting zone is too narrow, it is possible to select an object to be focused out of a plurality of objects, while it is difficult for a photographer to aim the object, so that it happens to hardly bring the object into in-focus position successfully. Therefore, it is necessary that the focus detecting zone for photographing a motion-picture has a certain size. Then, FIG. 14(b); figure in the middle, shows the focus detecting zone which is approximately two times as broad as the focus detecting zone in FIG. 14(a). The focus detecting zone in FIG. 14(b) comprises two focus detecting zones, each of which is the same size as the focus detecting zone shown in FIG. 14(a). One of them is positioned at a left side of the focus detecting area and the other is positioned at a right side of the focus detecting area and both zones are arranged to overlap each other at a center position of the focus detecting area. The overlap is a half of each zone. Consequently, the focus detecting zone in FIG. 14(b) is provided with a double size compared with the focus detecting zone in FIG. 14(a) and at the respective focus detecting zones, focus detecting can be made independent of each other.

The automatic focusing apparatus in this embodiment is designed to select automatically the focus detecting zone shown in FIG. 14(a) as a spot area or the focus detecting zone shown in FIG. 14(b) as a wide area, depending on the situation of the object. Normally, focus detecting will be done at a narrow focus detecting zone as shown in FIG. 14(a), and when there is no object in the center of the photographic area as shown in FIG. 14(b), the focus detecting zone is automatically expanded, so that it is ensured to decrease the lack of focus detection as much as possible. Furthermore, when objects, which are located away from each other in the abovementioned wide area, are detected, results of focus detection are obtained from the focus detecting zone on the right and left sides independently, so that it is possible to bring an object on a close side (or a far side) into in-focus position. Besides, even if a plurality of objects exist, it is possible to bring the object located at the center of the photographic area into in-focus position as far as the object to be focused is located in the focus detecting zone positioned at the center of the photographic area by giving priority to the focus detecting zone to be used on a normal time. That is, the center-weighted focus detection is available. Two different indications subject to the result of the focus detection are provided in a view-finder. One is a spot mark in case of an object which is in the central area of the photographic area as shown in FIG. 14(a). The other is a broad mark in case of an object which is in the side area of the photographic area as shown in FIG. 14(b). Accordingly, a photographer can be informed of a present focus detecting information.

A method of selecting the focus detecting zone is, here, described in general as follows. Incidentally, Zone A, B and C in the abovementioned embodiment are represented in this embodiment by Block II, I and III correspondently.

First, when an object exists in the central area of the photographic area as shown in FIG. 14(a), focus detection can be made successfully at Block II. Therefore, a focus adjusting operation is always done at a central object first even if focus detection can be carried out at either Blocks I or III. That is, the center-weighted automatic focus detection can be made with first priority. Next, when the object does not exist in the central area of the photographic area but exists in both the right and left side area as shown in FIG. 14(b), it is impossible to measure the distance at Block II. But focus detection can be carried out at both Blocks I and III, so that either of the objects can be selected optionally. In this embodiment, for example, the object located closest to the video-camera is selected and focused optionally by detecting the object having the largest amount of defocus including a direction. In FIG. 14 (b), Block III (focus detecting zone on the right side) is selected. In addition, when two objects, which are located apart form each other at Block II as shown in FIG. 14(c) (figure on a lower side), exist simultaneously, it is decided which of objects is located closer to the video-camera. Furthermore, when the respective measuring results at both Blocks I and III (on left and right side) create much difference, either of Blocks I or III (for example Block having the object which is located closer to the video-camera) is selected even if focus detection can be carried out at the central area; Block II.

On the contrary to the above, when the respective measuring results at abovementioned both Block create a slight difference, the central area; Block II is selected.

Next, referring to FIGS. 15A and 15B, a selection method of the focus detecting zone is described below.

At step #1, integration at CCD is made while CCD line-sensor 33 in FIG. 3 is controlled through CCD interface (not shown). After completion of CCD integration at step #1, data produced at a specific area and a reference area of CCD line-sensor 33 is input to the microprocessor 39 through an A/D convertor (not shown) and are stored in a memory device in the microprocessor 39. After that, data assignment of the specific area to respective Blocks I, II and III is carried out at step #2, and at step #3, data of difference are calculated from assigned data belonging to each Block I, II and III at the specific area and data of the reference area. And then at step #4, correlation arithmetic for each Block I, II and III is carried out respectively, using the above-mentioned data of difference, and a maximum correlated position and its correlative amount and two correlative amounts at the positions for one pitch (one element of CCD) away before and behind the above-mentioned position are computed. At step #5, interpolation arithmetic is carried out using the above mentioned respective correlative amounts, and respective interpolation values $\{YM_I, XM_I\}$, $\{YM_{II}, XM_{II}\}$, $\{YM_{III}, X_{MIII}\}$ on respective Blocks I, II and III are computed. And a program advances to step #6 so as to evaluate reliability of the respective values which are computed as described above. At step #6, arithmetic of contrast regarding each Blocks I, II and III is carried out.

The selection of the focus detecting zone will be made as follows. First, when the object exists at the center of the photographic area as shown in FIG. 14(a), the focus detention is possible at Block II, so that the condition; $YM_{II}/C_{II} \leq K_2$ at step #7 is satisfied and then, the program advances to step #8. Furthermore, the focus detection at Blocks I and III is possible, too. Consequently, at step #8 the condition; $YM_I/C_I \leq K_1$ is satisfied, and the program advances to step #9. At step #9, the condition: $YM_{III}/C_{III} \leq K_3$ is also satisfied, and then the program advances to step #10. Incidentally, when either of Block I or Block III shows "low contrast", at step #8 or #9, it is not able to be decided which of objects is located closer to the video-camera. When such cases happen at step #8 or #9, the program goes to step #15. At step #10, arithmetic; $|XM_I - XM_{III}|$ is carried out so as to decide which object is located closer to the video-camera. In case of the situation as shown in FIG. 14(a), a part of the identical object is detected at both Blocks I and III, so that there is a slight difference between the respective defocus amounts $XM_I$, $XM_{III}$ which are computed as described above. Therefore, equation; $XM_I - XM_{III} \leq S$ (S represents threshold value) is satisfied, and the program goes to step #15. At step #15, Block II (the central focus detecting zone) is selected as well as an indication in the view-finder changes to the spot mark, and a photographic lens is driven on the basis of the defocus amount $XM_{II}$, and finally the lens is in in-focus position. Incidentally, the threshold value s is, for example, given by converting a defocus amount, which is equivalent to depth of field at a fully opened diaphragm, into an amount correlated to the direction of CCD elements array with image magnification (already known) of the focus detecting module 10.

Next, when the objects do not exist in the central focus detecting zone but exist in the focus detecting zones on both sides as shown in FIG. 14(b), there is no detectable object in Block II, so that it is decided at step #7 that "low-contrast", and the program goes to step #11 shown in FIG. 15B. As the detectable objects exist in Block I, the condition; $YM_I/C_I \leq K_1$ is satisfied at step #11, so that the program advances to step #12. The condition; $YM_{III}/C_{III} \leq K_3$ is satisfied at step #12 since the detectable objects exist in Block III, so that the program advances to step #13. In case of the situation as shown in FIG. 14(b), the detectable object exist in both Block I (on the left side) and Block III (on the right side), so that the focus detection is possible at both Blocks I and III. However, the respective defocus amounts $XM_I$, $XM_{III}$ to be detected are different from each other. Compared with which objects in Block I, and in Block III is located closer to the video-camera, when the measuring result of $XM_I \leq XM_{III}$ is obtained at step #13, the condition; $XM_I \leq XM_{III}$ is satisfied. Therefore the program goes to step #17. As a result of the above, Block III (focus detecting zone on the right side) is selected. If Block I or Block III is selected, the indication in the view-finder changes to the broad mark as shown in FIG. 14(b). When the focus detecting area is expanded as described above, the focus adjustment is carried out at one focus detecting zone, where the object which is located closer to the video-camera exists as well as which is selected out of two focus detecting zones on both sides.

Next, in case of the situation as shown in FIG. 14(c), objects exist in all of Block I, II and III. In Block II, particularly, there are two objects, of which one object is located apart from the other. In this connection, there is difference between two situations as shown in FIGS. 14(b) and 14(C). In this case, the detected result at Block II is equivalent to the decided result of "low contrast", or equivalent to the detected result at the center position between two objects. Assuming that it is decided at step #7 that Block II is a state of "low contrast", the microprocessor 39 takes a same procedure as taken for FIG. 14(b). That is, in FIG. 14(C), Block III (the focus detecting zone on the right side) is selected and the program advances to the next step. However, a problem, i.e. wrong focus detection, occurs if it is not decided at step #7 that Block II is a state of "low contrast".

Accordingly, the wrong focus detection is prevented by the transaction which is carried out at step #8 to Step #10, since the transition from step #8 to step #10 is to detect a state of coexistence of two objects in one Block. That is, it is decided at step #8 and step #9 whether or not the focus detection at other Blocks I, III except Block II can be made. When the focus detection is possible at respective Blocks I, II and III, the program advances to step #10. It is decided at step #10 whether or not the result of arithmetic; $|XM_I - XM_{III}|$ is larger than threshold values S. When $|XM_I - XM_{III}| \leq S$ is satisfied, the program advances to step #11 because a plurality of objects exist in the focus detecting area. If not, the program goes to step #15. At step #11, the object which is located at either of Block I or Block III as well as is located closer to the video-camera is selected, and focusing at the abovementioned object is carried out. In case of the situation as shown in FIG. 14(c), for example, the focus detecting zone (Block III) has been selected, and focusing is carried out at that zone. On the contrary to the above, when the result of $|XM_I - XM_{III}|$ is less than threshold value S, the photographic lens is driven so as to focus on the middle position between two objects. As described above, if threshold value S is determined within the range of depth of field, two objects exist within the range of depth of field so that the image does not come out of focus. Incidentally, the indication in the view-finder changes to the spot mark when selecting Block II, and it changes to the broad mark when selecting either of Block I or Block III. The abovementioned indication procedure does not make a photographer feel so strange.

As, already described, the automatic focusing mechanism of this embodiment enable the video-camera to decide which of objects is closest to the video-camera, using the detected results at zones of both sides, regardless of possibility whether or not the focus detection at the central zone is carried out, so that the automatic focusing apparatus with high accuracy can be provided.

Incidentally, when no detectable object to be focused at all zone; Blocks I, II and III exists, the program goes to step #18, and transaction of "low contrast" will be made. At step #18, the movement of the photographic lens is stopped so as to avoid an unnecessary movement as a motion picture.

Furthermore, in this embodiment, it is so arranged that the focus detecting zone, where the object which is closer to the video-camera exists, is selected out of both focus detecting zones on the right and left side. Alternatively, the focus detecting zone, where the object shows high contrast", may be selected. Under such a condition, the function of step #13 in FIG. 15(b) is changed as follows. That is, the comparison between $YM_I/C_I$ and $YM_{III}/C_{III}$ is carried out at step #13 instead of the comparison between $XM_I$ and $XM_{III}$. When $YM_I/C_I > YM_{III}/C_{III}$, the program goes to step #17 and Block III is selected. When $YM_I/C_I \leq YM_{III}/C_{III}$, the program goes to step #16 and Block I is selected.

In this embodiment, the explanation about the automatic focusing apparatus has been made under the condition that the automatic focusing apparatus is in use for a video-camera. Furthermore, it would be apparent that the apparatus can be used for a single-lens-reflex camera having a plurality of the focus detecting zones.

As described above, a plurality of the focus detecting zones which are constructed by dividing the focus detecting area, is provided with the above apparatus, and at the respective focus detecting zones, the focus detecting operation is carried out respectively. Furthermore, the focus detection can be carried out at each zone positioned in the center and both sides of the focus detecting area, and in addition to the above, when the difference between two results of focus detecting at the right and left side zones exceeds the predetermined value, it is decided that the state of coexistance of objects at one zone. Therefore, it is not necessary to carry out the focus detection once more at the concerned zone after dividing the focus detecting area into the respective zones, when the abovementioned decision has been made. Accordingly, it is advantageous that it does not take a long time for focus detecting in case of coexistance of objects. Furthermore, coexistance of objects is decided by the comparison of the defocus amount, so that its detection can be made without any influence of luminance or contrast of object, as compared with a conventional way in which coexistance of objects is decided by decreasing correspondence of two images. It is further advantageous that reliability of decision about coexistance of objects becomes high.

The invention has been described in detail with particular reference to the preferred embodiment thereof, but it will be understood that variations and modifications can be effected within the spirit and scope of the invention.

What is claimed is:

1. An automatic focusing apparatus for carrying out a focus adjustment of a photographic lens as to one focusing zone selected out of a plurality of focusing zones, wherein the improvement comprising:

means for detecting a defocus amount of said photographic lens as to said each focusing zone;
   means for memorizing the focusing zone at which focus adjustment of said photographic lens is carried out;
   means for comparing a specific setting value with the defocus amount detected by said defocus amount detecting means, with respect to the focusing zone memorized in said memorizing means;
   means for selecting the focusing zone so that the focus adjustment of said photographic lens is carried out as to the focusing zone, which is memorized in said memorizing means, when it is decided by said comparing means that said defocus amount is less than said specific setting value, on one hand, and the focus adjustment of said photographic lens is carried out as to the focusing zone having a minimum defocus amount selected out of a plurality of defocus amounts detected by said defocus amount detecting means when it is decided by said comparing means that the said defocus amount is larger than said specific setting value, on the other hand:
   means for carrying out the focus adjustment of said photographic lens on the basis of the defocus amount of the focusing zone which has been selected by said selecting means; and
   means for memorizing new focusing zone selected by said selecting means in said memorizing means instead of the focusing zone previously memorized when the focusing zone selected by said selecting means is different from the focusing zone memorized in said memorizing means.

2. An automatic focusing apparatus, comprising
   a photographic lens;
   detecting means, having a plurality of focusing zones, for detecting focusing condition of said photographic lens at each focusing zone and calculating defocus amounts at each focusing zone;
   determining means for determining a control amount to be used for the focus adjustment, said determining means including means for obtaining absolute values of the defocus amounts calculated by said detecting means and means for adopting as the control amount a defocus amount having the minimum absolute value among the calculated defocus amounts; and
   driving means for driving said photographic lens on the basis of the control amount.

3. An automatic focusing apparatus as claimed in claim 2, wherein the plurality of focusing zones includes a first focusing zone set on a central portion of a photographic area and second and third focusing zones set on different portions partially overlapping the first focusing zone respectively.

4. An automatic focusing apparatus as claimed in claim 2, wherein said detecting means repeats the focus detecting operation at a predetermined cycle, and said determining means further comprising means for preferentially selecting a focusing zone of which defocus amount at the last detecting cycle has been used as the control amount and comparing means for comparing the absolute value of a defocus amount at the selected focusing zone detected at the present detecting cycle with a predetermined value, said determining means adopting the defocus amount at the selected focusing zone when the absolute value of the defocus amount at the selected focusing zone is equal to or less than the predetermined value.

5. An automatic focusing apparatus as claimed in claim 4, wherein the plurality of focusing zone includes a first focusing zone set on a central portion of a photographic area and a second focusing zone set on a portion other than the central portion, and said determining means preferentially selecting as the control amount a defocus amount at the first focusing zone at a first detecting cycle by said detecting means.

6. An automatic focusing apparatus as claimed in claim 5, further comprising display means for displaying onto a view finder a focusing zone of which defocus amount is adopted for the lens driving, said display means changing the focusing zone in accordance with the selection of focusing zone by said determining means.

7. An automatic focusing apparatus, comprising:
a photographic lens including a focusing lens used for focus adjustment;
detecting means, having a plurality of focusing zones, for repeating detecting focusing condition of said focusing lens at each focusing zone and calculating defocus amounts at each focusing zone;
selecting means for automatically selecting a defocus amount having a value closest to a present focusing position of said focusing lens; and
means for driving said focusing lens on the basis of the selected defocus amount.

8. An automatic focusing apparatus as claimed in claim 7, wherein the plurality of focusing zones includes a first focusing zone set on a central portion of a photographic area and second and third focusing zones set on different portions partially overlapping the first focusing zone respectively.

9. An automatic focusing apparatus as claimed in claim 8, further comprising display means for displaying onto a view finder a focusing zone of which defocus amount is adopted for the lens driving, said display means changing the focusing zone in accordance with the selection of focusing zone by said determining means.

10. An automatic focusing apparatus as claimed in claim 7, wherein said detecting means repeats the focus detecting operation at a predetermined cycle, and said determining means further comprising means for preferentially selecting a focusing zone of which defocus amount at the last detecting cycle has been used as the control amount and comparing means for comparing the absolute value of a defocus amount at the selected focusing zone detected at the present detecting cycle with a predetermined value, said determining means adopting the defocus amount at the selected focusing zone when the absolute value of the defocus amount at the selected focusing zone is equal to or less than the predetermined value.

11. An automatic focusing apparatus, comprising:
a photographic lens;
detecting means having a plurality of focusing zones for periodically detecting focusing condition of said photographic lens and periodically calculating a defocus amount;
means for determining a control amount to be used for focus adjustment, including means for preferentially selecting a focusing zone of which defocus amount has been used for the lens driving, comparing means for comparing the absolute value of a defocus amount at the selected focusing zone at the present detecting cycle with a predetermined value, and means for adopting as the control amount the defocus amount at the selected focusing zone when the absolute value of the defocus amount at the selected focusing zone is equal to or less than the predetermined value, and adopting one of defocus amounts at the focusing zones other than the selected focusing zone when the absolute value of the defocus amount at the selected focusing zone is more than the predetermined value.

12. An automatic focusing apparatus as claimed in claim 11, wherein said adopting means adopts a defocus amount, when the absolute value of the defocus amount at the selected focusing zone is more than the predetermined value, the absolute value of which having the smallest value among the defocus amounts at the focusing zones other than the selected focusing zone.

13. An automatic focusing apparatus as claimed in claim 12, further comprising display means for displaying onto a view finder a focusing zone of which defocus amount is adopted for the lens driving, said display means changing the focusing zone in accordance with the selection of focusing zone by said determining means.

14. An automatic focusing apparatus, comprising:
a photographic lens;
detecting means, having a plurality of focusing zones, for determining a defocus amount representing a focusing condition of said photographic lens; and
means for driving said photographic lens on the basis of the determined defocus amount,
said determining means including means for preferentially selecting a focusing zone of which defocus amount has been used for the lens driving by said driving means, first detecting means for detecting a defocus amount at the selected focusing zone, comparing means for comparing the absolute value of the detected defocus amount with a predetermined value, first adopting means for adopting the detected defocus amount as a control amount to be used by said driving means when the absolute value of the defocus amount detected by said first detecting means is equal to or less than the predetermined value, second detecting means, operable when the absolute value of the defocus amount detected by said first detecting means is larger than the predetermined value, for detecting defocus amounts at the focusing zones other than the selected focusing zone, and second adopting means for adopting one of defocus amounts detected by said second detecting means as a control amount to be used by said driving means when the absolute value of the defocus amount detected by said first detecting means is larger than the predetermined value.

15. An automatic focusing apparatus as claimed in claim 14, wherein said second adopting means includes second selecting means for selecting a focusing zone on the basis of the defocus amounts detected by said second detecting means, a defocus amount at the selected focusing zone being used by said driving means.

16. An automatic focusing apparatus as claimed in claim 15, wherein said second selecting means selects a focusing zone of which defocus amount having the smallest value among the defocus amounts detected by said second detecting means.

17. An automatic focusing apparatus as claimed in claim 16, further comprising display means for displaying onto a view finder a focusing zone of which defocus amount is adopted for the lens driving, said display means changing the focusing zone in accordance with the selection of focusing zone by said determining means.

18. An automatic focusing apparatus as claimed in claim 16, wherein the plurality of focusing zones include a first focusing zone set on a central portion of a photographic area and a second focusing zone set on a portion other than the central portion, and said first selecting means selects the first focusing zone when said determining means initiates the focus detecting operation.

19. An automatic focusing apparatus, comprising:
a photographic lens;
detecting means, having a plurality of focusing zones, for detecting focusing condition of said photographic lens and calculating a defocus amount; and
means for driving said photographic lens on the basis of the defocus amount,
said means for detecting and calculating including means for preferentially selecting a focusing zone of which defocus amount has been used by said driving means, first detecting means for detecting the possibility of focus detection at the selected focusing zone, first calculating means for calculating defocus amount at the selected focusing zone, second calculating means for calculating defocus amounts at focusing zones other than the selected zone, second selecting means for selecting a defocus amount having the smallest value among the defocus amounts detected by said second calculating means, first adopting means for adopting a defocus amount detected by said first calculating means as a defocus amount to be used by said driving means when said first detecting means detects the possibility of focus detection, and second adopting means for adopting the defocus amount selected by said second selecting means as a defocus amount to be used by said driving means when said first detecting means detects the impossibility of the focus detection.

20. An automatic focusing apparatus, comprising:
a photographic lens;
focus detecting means for detecting focus condition of said photographic lens and having a first focusing zone set on a central portion of a photographic area, second and third focusing zones set on portions different from that of said first focusing portion and symmetric with respect to the portion of the first focusing zone respectively, and for calculating defocus amounts at each focusing zone;
determining means for determining a control amount, including first means for deciding the control amount taken into consideration of the all defocus amounts detected by said focus detecting means when the focus detection by said focus detecting means is possible and second means for adopting as the control amount a defocus amount at the first focusing zone when at least one of the focus detection at the second and third focusing zones is impossible with the focus detection at the first focusing zone being possible; and
driving means for driving said photographic lens on the basis of the control amount determined by said determining means.

21. An automatic focusing apparatus as claimed in claim 20, wherein said first means decides as the control amount a defocus amount at the first focusing zone when the absolute value of the difference between the defocus amounts at the second focusing zone and the third focusing zone is equal to or less than a predetermined value.

22. An automatic focusing apparatus as claimed in claim 20, wherein said first means decides as the control amount a defocus amount on the basis of defocus amounts at the second focusing zone and the third focusing zone when the absolute value of the difference between the defocus amounts at the second focusing zone and the third focusing zone is larger than a predetermined value.

23. An automatic focusing apparatus as claimed in claim 22, wherein said first means adopts a defocus amount closer to a present focusing position of said photographic lens among defocus amounts at the second focusing zone and the third focusing zone.

24. An automatic focusing apparatus, comprising:
a photographic lens;
focus detecting means for detecting focus condition of said photographic lens and having a first focusing zone set on a central portion of a photographic area, second and third focusing zones set on portions partially overlapping the first focusing zone and symmetric with respect to the portion of the first focusing zone respectively, and for calculating a defocus amount at each focusing zone;
determining means for determining a control amount on the basis of defocus amounts at the second and third focusing zones when the focus detection at all focusing zones is possible; and
driving means for driving said photographic lens on the basis of the control amount.

25. An automatic focusing apparatus as claimed in claim 24, wherein said determining means determines the control amount by comparing the absolute value of the difference between the defocus amounts at the second focusing zone and the third focusing zone with a predetermined value.

26. An automatic focusing apparatus as claimed in claim 25, wherein said determining means determines as the control amount a defocus amount at the first focusing zone when the absolute value of the difference is equal to or less than the predetermined value.

27. An automatic focusing apparatus as claimed in claim 25, wherein said determining means determines as the control amount one of the defocus amounts at the second and third focusing zones when the absolute value of the difference is more than the predetermined value.

28. An automatic focusing apparatus as claimed in claim 27, wherein said determining means adopts a defocus amount closer to a present focusing position of said photographic lens among defocus amounts at the second focusing zone and the third focusing zone.

* * * * *